US011200302B2

(12) United States Patent
Burgess et al.

(10) Patent No.: US 11,200,302 B2
(45) Date of Patent: Dec. 14, 2021

(54) SYSTEM AND METHOD OF DATA COGNITION INCORPORATING AUTONOMOUS SECURITY PROTECTION

(71) Applicants: Shelia Jean Burgess, Haymarket, VA (US); George G. Burgess, IV, Haymarket, VA (US)

(72) Inventors: Shelia Jean Burgess, Haymarket, VA (US); George G. Burgess, IV, Haymarket, VA (US)

(73) Assignee: Azos AI, LLC, Haymarket, VA (US)

( * ) Notice: Subject to any disclaimer, the term of this patent is extended or adjusted under 35 U.S.C. 154(b) by 0 days.

(21) Appl. No.: 14/716,341

(22) Filed: May 19, 2015

(65) Prior Publication Data

US 2015/0254442 A1 Sep. 10, 2015

Related U.S. Application Data

(60) Division of application No. 12/164,844, filed on Jun. 30, 2008, now Pat. No. 9,038,193, which is a
(Continued)

(51) Int. Cl.
*G06F 21/62* (2013.01)
*G06F 21/31* (2013.01)
(Continued)

(52) U.S. Cl.
CPC .......... *G06F 21/316* (2013.01); *G06F 21/552* (2013.01); *G06F 21/6209* (2013.01);
(Continued)

(58) Field of Classification Search
CPC ................. G06F 21/316; G06F 21/552; G06F 21/62–21/6281; G06F 2221/2101;
(Continued)

(56) References Cited

U.S. PATENT DOCUMENTS 6,763,464 B2 * 7/2004 Wang ...................... G06F 21/10
380/201
7,068,787 B1 * 6/2006 Ta ............................ G06F 21/10
380/200
(Continued)

*Primary Examiner* — Minh Dinh
(74) *Attorney, Agent, or Firm* — Lee C. Heiman

(57) ABSTRACT

Autonomous embedded data cognition enables data to perform real-time environmental configuration control, self-manage, perform analyses, determine its current situation, and evaluate behavior to respond accordingly. When created, security measures, and access controls are selected. Highly sensitive data can be extracted and substituted with creator label and/or functional representation. Data-to-data reasoning and analysis can be performed. The processing method comprises autonomous monitoring for a state change and analyzing the current user to determine if the instantiation should exist. If affirmed, the cognition engine automatically configures the computational environment in which it resides. If denied, environmental behavior is further analyzed for security problems or an erroneous situation. If detected, the creator is alerted and provided with incident information enabling remote creator control of the data. Cognitive data can decide to self-destruct mitigating risk of undesirable instantiations. Intelligent Agents, a comprehensive data structure, and intelligent document means are leveraged for implementation.

10 Claims, 23 Drawing Sheets

Cognitive Data Framework

Related U.S. Application Data continuation-in-part of application No. 11/968,509, filed on Jan. 2, 2008, now abandoned, which is a continuation-in-part of application No. 11/281,198, filed on Nov. 16, 2005, now abandoned.

(51) Int. Cl.
*G06F 21/55* (2013.01)
*H04L 12/66* (2006.01)

(52) U.S. Cl.
CPC ...... *H04L 12/66* (2013.01); *G06F 2221/2101* (2013.01); *G06F 2221/2105* (2013.01); *G06F 2221/2107* (2013.01); *G06F 2221/2149* (2013.01)

(58) Field of Classification Search
CPC ..... G06F 2221/2105; G06F 2221/2107; G06F 2221/2149; H04L 12/66
See application file for complete search history.

(56) References Cited

U.S. PATENT DOCUMENTS

| | | | | |
|---|---|---|---|---|
| 7,484,245 | B1* | 1/2009 | Friedman | G06F 21/52 380/283 |
| 8,554,749 | B2* | 10/2013 | Herbach | G06F 9/00 707/694 |
| 2003/0135752 | A1* | 7/2003 | Sokolic | G06F 21/6245 726/21 |
| 2004/0205537 | A1* | 10/2004 | Graham | G06Q 10/10 715/229 |

* cited by examiner

SYSTEM AND METHOD OF DATA COGNITION INCORPORATING AUTONOMOUS SECURITY PROTECTION

CROSS-REFERENCE TO RELATED APPLICATIONS

This application is a continuation-in part application of co-pending U.S. patent application Ser. No. 11/968,509 filed Jan. 2, 2008, which is a continuation-in-part application of U.S. patent application Ser. No. 11/281,198 filed Nov. 16, 2005, which is now abandoned, which was a continuation application of U.S. patent application Ser. No. 10/056,246 filed Jan. 24, 2002, which is now abandoned, which was a continuation-in-part application of U.S. patent application Ser. No. 09/293,041 filed Apr. 16, 1999, which is now U.S. Pat. No. 6,359,970, which claims benefit of priority of U.S. Provisional Application Ser. No. 60/103,653, filed Oct. 9, 1998 and U.S. Provisional Application Ser. No. 60/096,594 filed Aug. 14, 1998, and the disclosures of all are hereby incorporated by reference in their entirety.

COPYRIGHT NOTICE

This patent document contains information and material subject to copyright protection. The copyright owner has no objection to the facsimile reproduction by anyone of the patent document or the patent disclosure, as it appears in the U.S. Patent and Trademark Office files or records but otherwise reserves all copyright rights whatsoever.

FIELD OF THE INVENTION

Aspects of the present invention relate in general to a system and methodology for data cognition that incorporates autonomous security protection. More particularly, the invention relates to system and methodology cognitive data that perform analyses, self-manage, secure its environment, evaluate behavior, detect security problems, adapt, alert the creator of an urgent situation, and provide traceability.

BACKGROUND OF THE INVENTION

Society is bombarded with malicious cybercrime. Personal and corporate data theft as well as data alteration plague our reliance on computer technology. The U.S. Security and Intelligent Documents Business Unit reported an estimated 13.3 people become victims of document and identity fraud every 60 seconds with almost seven million victims per year. Botnets and hackers compromise networks to steal data. Cybercrime is difficult to track. A computer criminal can use open cyber cafe computers, moving from server to server, changing Internet providers, using false information to register, and can steal service from unsecured wireless access points.

Once networks are penetrated, security means to protect data such as encryption, security protocols, data access, and authentication schemes are not enough. It is widely accepted that disk encryption protects sensitive data when misappropriated. However, researchers at Princeton University demonstrated that even when encrypted, the data can easily be read without physical access to the computer. Combating cybercrime and cyberterrorism is of daunting concern among federal officials who ask "when our networks are attacked and rendered useless, how do we regain access to our data?" The Pentagon alone logged 1,300 successful intrusions in 2005. Chinese hackers penetrated U.S. State Department computers of which hundreds had to be replaced or taken offline for months.

Company computer systems are protected by multiple layers of security including data encryption, Digital Rights Management (DRM), and Enterprise Rights Management (ERM). These server-centric solutions require access management infrastructure such as enterprise or licensing server communication to authorize data access. However, employee misconduct and unintentional actions like errors and omissions are the greatest cause of data security breaches. Criminal activity can and does occur inside corporations and agencies. A perpetrator has ready access beyond the security measures in place. Recent high-profile laptop thefts by insiders include a Veterans Administration computer containing information on 26 million veterans, and a University of California-Berkeley laptop with more than 98,000 graduate students' data, plus others.

In addition, emergency incidences that require first responders and other government agencies to resolve an incident at the national level as defined in the U.S. Department of Homeland Security Nation Incident Management System (NIMS) may require classified data usage. Concerns in supporting NIMS are the loss of control of classified data instantiations that were shared during the incident.

Intelligent documents are interactive electronic documents that usually require Web or network server access. Network reliance makes these solutions vulnerable to security breaches. For, even if the user is authorized to access the data, is the data still may not be protected. Upon opening the data or document, the computer environment in which it will be opened may not be secure. This scheme still relies on the network security and third party software such as virus protectors, spyware, and firewall protection. Hackers could breach the network, third party solutions may not detect the latest cyber threat, or the user may not have the latest security update.

It is very desirable to provide users with the capability of limiting their exposure to cybercrime, data breaches, and to protect data where even if a perpetrator is successful in overcoming network security barriers and obtains an instantiation of the data, it will be to no avail. Instead of relying on outside resources in application server-centric architectures, there is a need for the data itself to be intelligent and autonomous. The data itself needs to evaluate its situation and employ cognition to advance to new degrees of security and capabilities. There is a need for data to evaluate and configure its environment before it opens, to analyze behavior, perform data-to-data relationship analysis, and to take necessary measures for self-protection, self-destruction, and in certain circumstances, report back to its creator. If the data itself knows who it is, where it is, and how it should interact, it can configure and monitor the computer environment to support its own needs. There exists a strong need for data that possesses cognition and this level of security. Data that can "think for itself" and reason based on its situation could greatly advance data security and become a major roadblock for cybercrime and cyberterrorism.

SUMMARY OF THE INVENTION

Accordingly, one object of the present invention is to provide a system and method for cognitive data to make decisions autonomously and not rely on network, Internet, or server resources to analyze and control the environment in which it resides, whereby the data self-protect, self-manage, and if need be, alert the data creator and self-destruct.

Another object of the present invention is to provide autonomous data security, severing reliance on network-centric solutions, systems administration, network management, and the creator to ensure the environment is free from unsafe conditions before accessing the data. Embedding autonomous security into the data itself mitigates potential security incidences and human errors.

Another object of the present invention is to provide a method and system for limiting the creator's exposure to undesired data breaches and malicious cyber activity that involves theft or unscrupulous means of obtaining data by implementing a new security means of data processing wherein autonomous security can be embedded in data comprising digital documents, digital databases, digital data files, digital media, and digital multimedia.

Another object of the present invention is to provide a method and system wherein only instantiations of data that the creator is aware of exists. Therefore, the creator retains control of their data.

Another object of the present invention is remove direct access to highly sensitive data by substitution of meaningful label fields thus stripping out the highly sensitive data to further protect it from breaches and erroneous handling.

Another object of the present invention is to provide a method and system for data-to-data interrelationships behavior wherein these data can analyze and reason among themselves enabling analyses, calculations, and evaluations, thus performing intelligent situational analyses, making conditional determinations and present higher-order data conclusions.

Another object of the present invention is to create a cognition engine to enable a foundation for data intelligence, adaptivity, and reasoning.

Another object of the present invention is to provide a method and system wherein the creator is alerted to an urgent or emergency situation wherein their data is compromised and/or obtained maliciously. This alerting could resolve serious infractions enabling the creator to respond immediately to protect their privacy against situations such as identity theft through the misappropriation of data.

One more object of the invention is to provide a methodology and system in which data are self-managed and self-controlled depending on the level of security the data needs, behavior evaluations the data performs, time-of-day, frequency accessed, age, access duration, security and/or sensitivity level, and data field attributes of the particular data created according to the creator preferences.

In one embodiment of the present invention, a method and system advantageously protects user's exposure to undesired and malicious activity by employing advanced control mechanisms implemented as an embedded data processing capability. The cognitive data methodology and system permits the creator to proactively take control of whom, how, when, and if another party may possess their data. Advantageously, the disclosed methodology transforms data from a passive file that can be obtained, compromised and misused by anyone to a cognitive data instantiation that possesses environmental control and self-management offering the creator protection, security, and advanced analyses. Upon the creator associating key words, key aspects, and/or key data body elements with labels and/or functions, these can be leveraged for analyses. This capability can customize cognitive data per the creator's priorities and needs to keep sensitive data private. It also provides an intelligent means for unique configuration of the environment based on data security requirements in order to self-protect while in use. Cognitive data are managed and controlled depending on the environment, state, security, trust, and the intelligence level of the particular cognitive data instantiation. The data can perform behavior analyses to support its needs and those of its creator or user. The creator is empowered to take control over and limit access to their private sensitive data. Artificial Intelligence is also implemented to create an adaptive data cognition capability.

A method and system is disclosed for the creation and processing of cognitive data. In one embodiment, the system is a framework that comprises a cognition engine, cognitive data structure, and supportive processes in a computational environment such as a computer. Creator preferences are selected from a plurality of cognition and security levels, access and data management controls, and permissions upon creation of cognitive data. A data stripper is used to extract and encrypt highly sensitive data which may be represented with associated data field labels. The associated data field labels and other data features can be leveraged to perform data-to-data evaluation and behavior analyses. The method includes monitoring the computational environment for a change of state in an instantiation of cognitive data, determining who originally created the data, if the current user is the creator, and if the user is permitted to possess the cognitive data instantiation. If the instantiation is permitted, the security requirements are determined. Then the environment is configured accordingly, finally granting the current user access to the data dependent on the creator controls and limitations. If the instantiation is not permitted, the cognitive data performs self-analysis and self-management which comprises the data's level of insecurity, behavior analysis, data-to-data analysis, and self-destruction. When the cognitive data detects misappropriation, it alerts the creator comprising the identity of the perpetrator and their environment enabling creator remote control of the cognitive data even after a breach situation.

BRIEF DESCRIPTION OF THE DRAWINGS

The features of the invention believed to be novel are specifically set forth in the appended claims. However, the invention itself, both as to its structure and method of operation, may best be understood by referring to the following description and accompanying drawings.

DETAILED DESCRIPTION OF THE INVENTION

The present invention includes a cognitive data system and method that enables the creator of sensitive and private data to maintain control even after an intrusive breach and malicious activity. This invention offers data privacy, security, and protection to the creator. Advantageously, the systems and methods of the present invention enable consumers to regain control of their digitally stored data accomplishing privacy and autonomous data security at a new level by embedding these enabling capabilities. Along with these advantages, the creator of the data can embed proactive preferences for data management and be alerted to another party acquiring their data and the status of said data. The creator can indicate if their said data should self-destruct, thus eliminating the instantiation of the misappropriated data. This capability enables the creator to maintain remote control of their data. This invention provides users with retroactive means upon the event of a data breach or cyber attack.

For purposes of illustration only, and not to limit generality, the cognitive data system and method will be explained with reference to its use in a digital computer environment. The terms cognitive data and intelligent data are equivalent and may be interchanged herein. The states, framework, creation, data and environment management, and processing of cognitive data comprises one example of this application. The cognitive data system and method includes automated control logic that intelligently integrates data control and management functions yielding a proactive system with embedded user control preferences and data cognition. This cognitive data system and method possesses data which can be in one of at least three states:

Active or "Awake" state wherein the data is being used, created, manipulated, open, modified, copied, etc.

Dormant or "Sleep" state wherein the data is not in use (e.g., the data is stored on digital media).

Moving state wherein transmission of the data is taking place. Moving state can be considered a type of "Awake" state as the cognitive data is aware of this event.

Figure 1:
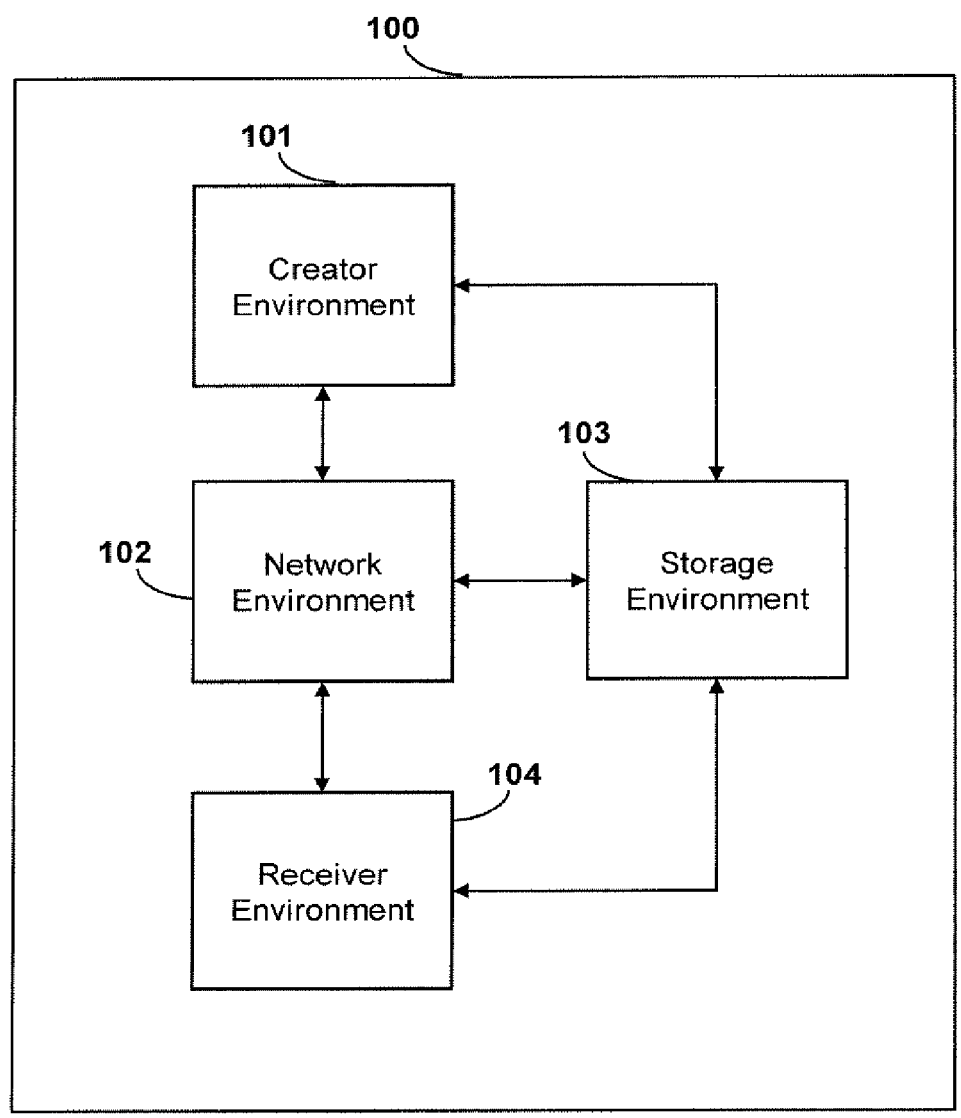
FIG. 1 is a functional block diagram showing the overall relationship of the disclosed cognitive data system and method relative to environments in which it resides.

The cognitive data system and method can exist in a plurality environments or domains. More particularly, FIG. 1 is a functional block diagram showing the overall relationship of the disclosed cognitive data system 100 and method relative to environments or domains in which the cognitive data can reside and function. Data can exist in a creator environment 101 which is the environment from which the data originated (i.e., original instantiation). Data may also reside in the network environment 102 (e.g., an internet or network server). Data can reside in a storage environment 103 (e.g., media storage means, hard drives, DVDs, CD-ROMs, disk drives, media sticks, etc.). This storage environment 103 can be accessed either via the creator environment 101 directly (i.e., the media device port communication with the creator environment port via hardware or wirelessly) or indirectly via a network environment 102 (e.g., a local network server or residing remotely via internet resources). Finally, the data may reside in a receiving party's environment 104 such as a receiving party's computer. Data can be received in the receiver environment 104 via a storage environment 103 means or via a network environment 102 means.

Figure 2:
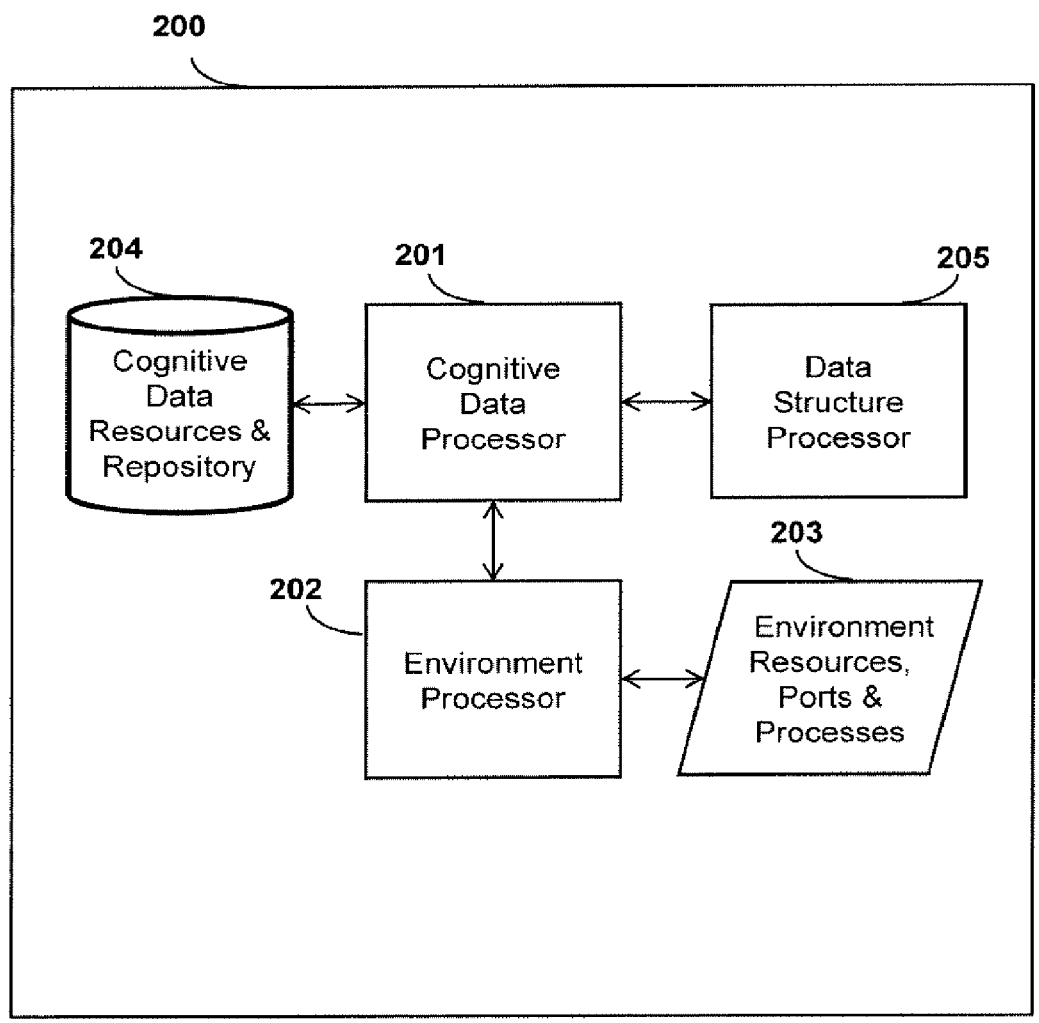
FIG. 2 is a functional block diagram showing the basic elements of the cognitive data framework.

An cognitive data framework 200 is depicted in FIG. 2. This framework 200 comprises an Cognitive Data Processor 201 which enables the overall cognitive data processing, creation, cognition, and control. The Cognitive Data Framework 200 also comprises an Environment Processor 202 to configure, secure and control environment resources upon a "state" change of the cognitive data. The Environment Processor 202 configures and controls ports, devices, resources, and processes 203. Creator preferences and resources needed to create, support, and process cognitive data are provided and stored in the environment's Cognitive Data Resources and Memory Repository 204. The Cognitive Data Processor 201 accesses the Data Structure Processor 205 to create and access cognitive data.

For a functional processing example, suppose a user of an environment decides to access the Internet while a high level of security cognitive data file is active; the Environment Processor 202 would close the high security cognitive data file then, open the ports and activate the processes 203 necessary for the user to access the Internet. Conversely, these ports would be closed in order to re-open the cognitive data file. Additionally, the Cognitive Data Resources and Repository 204 may comprise log information, Intelligent Agents (IA) instantiations to be used and/or associated with cognitive data, stripped data (i.e., data elements or fields extracted or stripped out of the main body of an cognitive data file), and additional metadata. Access to the Cognitive Data Resources and Repository 204 may be restricted to provide additional protection to secure the contents.

The Cognitive Data Processor 201 components in this embodiment comprise a Security Level Process, Intelligence Level Process, Access Process, Data Structure Process, Stripper Process, Environment Process, and a cognition engine produce by a Multi-Agent System (MAS). The cognition engine is incorporated into the cognitive data file. A comprehensive data structure is incorporated into this processing. This embodiment produces a cognitive data set wherein a cognitive data file is produced along with an associated stripped cognitive data file containing highly sensitive information.

Figure 3:
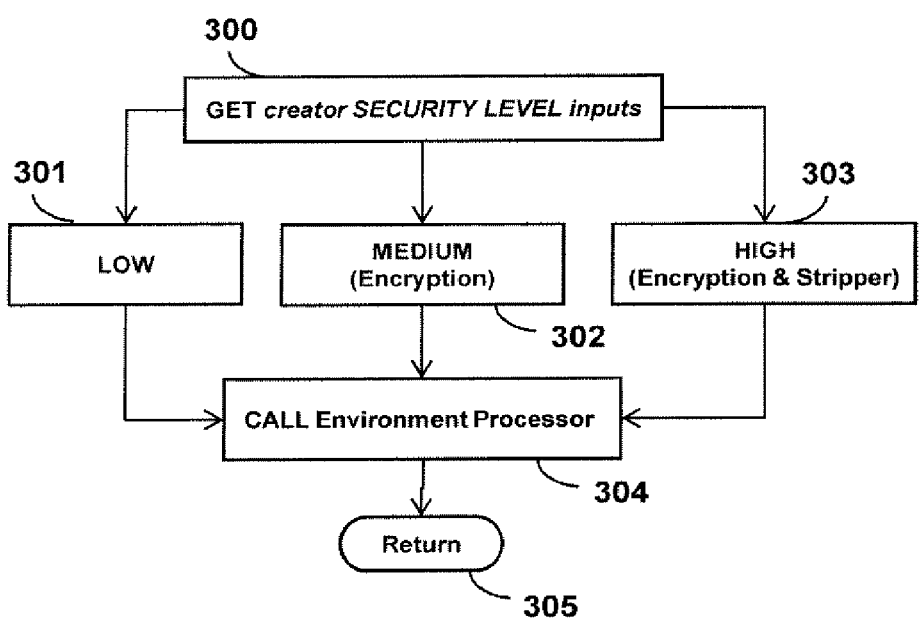
FIG. 3 is a flow diagram of the Cognitive Data Processor security level process.

Further examination of the cognitive data as it relates to self-protection management requires security level knowledge. FIG. 3 depicts the Cognitive Data Processor 200 for security level processing flow. A plurality of security levels can be implemented and supported. By way of example, this embodiment obtains a security level setting from the cognitive data creator via a keyboard and/or mouse inputs at a digital computer wherein the Cognitive Data Processor 200 reads the desired user security level setting 300 from a plurality of settings comprising low 301, medium 302, and high 303 security level selection possibilities. Then the Environment Processor is called in step 304 as the security level selection influences the environment settings required to access and activate cognitive data. For example, the medium 302 security level setting may require the environment close ports to the Internet while the cognitive data file is in the "active" state.

By way of example for this embodiment, the medium 302 security level will incorporate the environmental settings for the low 301 security level plus encrypt the resulting data. Encryption can be achieved via standardized commercially available software and/or operating system calls. For example, Microsoft's Windows Operating System's Data Protection Application Programming Interface (DPAPI) consists of a pair of function calls that provide Operating System-level data protection through data encryption. Since the data protection is part of the Operating System, securing data can be achieved without the need for any specific cryptographic code other than the function calls to DPAPI. The Cryptprotect_Promptstruct is the "prompt structure" and the protected data structure holds the protected data. The two functions comprise the protect data function CryptProtectData( ) and the unprotect function of CryptUnprotectData( ).

In this example, the high 303 security level selection incorporates all the security means of the medium 302 level of security as well as strips the data. (Data stripping will be discussed later.) The security level selection is used as an input into the Environment Processor 304 which configures the environment to the appropriate level of protection. Once the Environment Processor is invoked and returns this process ends 305.

Figure 4:
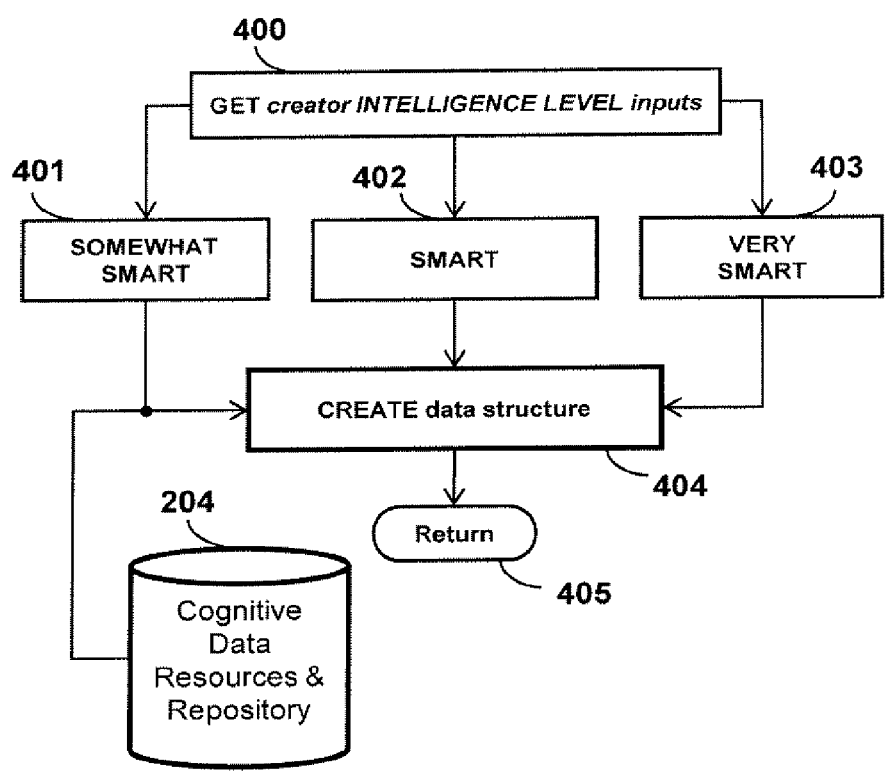
FIG. 4 is a flow diagram of the Cognitive Data Processor intelligence level process.

The Cognitive Data Processor 201 also provides a means for the creator to select "how smart" the cognitive data should be. FIG. 4 depicts the Cognitive Data Processor 200 intelligence level processing flow. A plurality of intelligence levels can be implemented. By way of example, this embodiment obtains an intelligence level setting from the cognitive data creator via a keyboard and/or mouse inputs wherein the Cognitive Data Processor 201 reads the creator selected data intelligence level setting 400 that ranges from "somewhat smart" 401, "smart" 402, and "very smart" 403. For the "somewhat smart" 401 case, the cognitive data is created 404 leveraging resources from the Cognitive Data Resources and Repository 204. (The smart data structure is defined later.) If the "smart" 402 level of intelligence is selected, a more cognitive creation of the cognitive data structure is created (e.g., additional data fields than those in the "somewhat smart" case are used). And finally, if the "very smart" 403 intelligence level is selected by the creator, the maximum intelligence that can be achieved is created (i.e., all the smart data structure fields are included). Once the cognitive data structure is created in step 404, this process ends 405.

Figure 5:
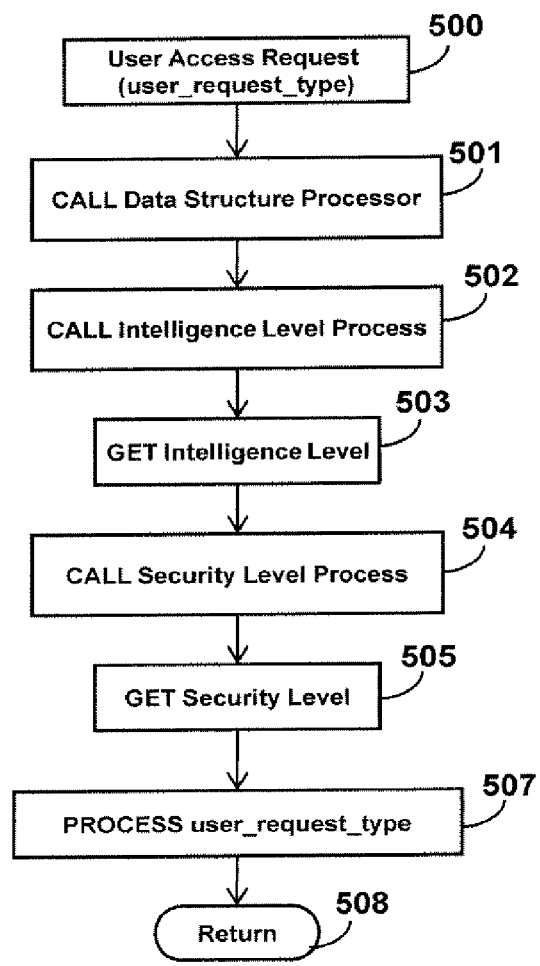
FIG. 5 is the flow diagram of the Cognitive Data Processor data access process.

The Cognitive Data Processor 202 also uses an Access Process that provides "access to" and/or "creation of" cognitive data. FIG. 5 depicts a flow diagram of the Cognitive Data Processor 202 access process. This process commences upon being called from the Cognitive Data Processor 202 MAS (the MAS will be discussed later), requesting user access to the cognitive data and passing the "user_request_type" argument in step 500. The Data Structure Processor is called in step 501 to create and/or access the cognitive data. The Intelligence Level Process is called 502 and the intelligence level field is read 503. Then the Security Level Process is called 504 to obtain the security level 505 required to access or create the cognitive data which subsequently calls the Environment Processor to configure the computer environment to meet the needs of the security level read from the data structure. Now Access Process is ready to execute the user_request_type in step 507 dependent on the prior processes controls, configuration, and parameters and returns to the calling process 508.

The Data Structure Processor 205 relies on the cognitive data file or record contents and structure. Primarily, the cognitive data file or cognitive data record structure by way of example in this embodiment comprises the following fields, metadata, and elements. Greater data cognition can be achieved upon leveraging the additional data fields for the "very smart" and "smart" cases beyond the "somewhat smart" data fields. Fields that are marked with "(vs)" are included in the "very smart" intelligence level data structure; fields marked with "(s)" are included in the "smart" intelligence level data structure; and fields marked with "(ss)" are included in the "somewhat smart" intelligence level data structure wherein a subset of these data fields comprises a less cognitive data structure:

1. Header/Identifier Information [(vs) (s) (ss) for all fields]
   Name
   Size
   Type
   Application(s) associated with the data
   Time stamp
   Date modified
2. Environment System Identity [(vs) (s) (ss) for all fields]
   A. (obtained from the ipconfig/all command)
   Host Name
   Domain name system (dns) server(s) addresses
   Primary DNS suffix
   Node type
   Internet protocol (IP) routing enabled
   Windows Internet Name Service (WINS) proxy enabled
   Physical address
   Dynamic Host Configuration Protocol (DHCP) enabled
   Auto configuration enabled
   IP address
   Subnet mask address
   Default gateway address
   Dhcp server address
   Connection specific dns suffix and description
   B. Additional [(vs) (s) fields]
   Use of digital certificate, license, and/or digital signature identifiers
   Use of registration data
   Use of claims or tokens (with .NET environments)
3. Creator Identity (in addition to using the environment identifiers) (first instance of cognitive data creation only)
   Name [(vs) (s) (ss)]
   License key if authentication is used [(vs) (s) (ss)]
   Registration/authentication data [(vs) (s) (ss)]
   Configuration data; a snapshot of the environment to use for comparison in future processing to aid further identification verification of the creator [(vs)]

4. User Identity [(vs) (s) (ss)]
   Name [(vs) (s) (ss)]
   License key if authentication is used [(vs) (s) (ss)]
   Registration/authentication data [(vs) (s) (ss)]
   Configuration data; a snapshot of the environment to use for comparison in future processing to aid further identification verification of the user [(vs)]
5. Security Level Setting
   High: Encrypt and Strip [(vs) (s) (ss)]
   Medium: Encrypt [(vs) (s) (ss)]
   Low:
      No internet access [(ss)] or,
      Limited internet access [(vs) and (s)] wherein trusted sites may be allowed
6. Current TRUST value (0, 5, 10) in this example [(vs) (s) (ss)]
7. Resource Restrictions or User Requests Allowable Settings (may also be dependent on Security Level Setting; the higher the security level, the greater the restrictions and/or user settings/preferences).
   Restrict Copy (yes/no) [(vs) (s)]
   Restrict Print (yes/no) [(vs) (s)]
   Restrict Edit (yes/no) [(vs) (s)]
   Restrict Delete (yes/no) [(vs) (s)]
   Restrict Save (yes/no) [(vs) (s)]
   Restrict View (yes/no) [(vs) (s)]
   Restrict Move (yes/no) [(vs) (s) (ss)]
   Restrict Analyze (yes/no) [(vs)]
8. Environment Control settings as a function of the Security Level
   Network status (e.g., using the operating system command "netstat—a" which returns information regarding anyone else being connected to your environment through any port as well as provide a list of all the open ports (a potential remote entry) wherein close port (port identity) for each port not needed this includes closing remote ports (remote port shutdown) [(vs) (s) (ss)]
   Close software application (application name) for each application not needed [(vs) (s) (ss)]
   Close resource device (resource identity) for each device not needed [(vs)]
   Allowable file manipulations dependent on security level [(vs) (s) (ss)]
      High Security: Authenticated printing, copying, screen prints, data modification
      Medium Security: Authenticated modification
9. Age control [(vs) (s) for all fields]
   Initial creation time and date
   Age limit or expiration (per timer setting or an expiration associated to an event or a date or duration)
   Update save times
   Duration while active
   Time of day access
   Day of week
10. Intelligence Level Setting (this field indicates appended support functions enabling intelligence) [(vs) (s) (ss) for all fields]
11. Stripper [(vs) (s) (ss) for all fields]
    Stripper identity
    Stripper attributes
    Stripper encoding
12. Associated Label [(vs) (s) (ss) for all fields]
    Stripper identity label
    Stripper attributes label
    Stripper encoding label
13. Related Data Names [(vs)]
    This field permits the user to associate other data files with this one.
14. The Body [(vs) (s) (ss) for all fields]
    The actual content record being created (this may also be a database or tables, media, multi-media, etc.) (Encrypted if security level is greater than "low")
15. Disclaimer [(vs) (s) (ss) for all fields]
    Statement regarding the data file created has limited permission of its existence wherein its existence may be controlled by the creator.

Note that the "creator" is uniquely identified at the first instantiation of the cognitive data creation. All other instantiations check the identity of the "current user" to determine if the original creator is the current user. This distinction is necessary to afford the original creator control of their cognitive data even from a remote environment. It should also be noted that a log is created by an event tracking means (i.e., the Tracker Agent which will be discussed later). This log data is comprised of all the data structure fields except the body. These fields assist in providing traceability of the cognitive data.

The cognitive data file or cognitive data record set is implemented as an "intelligent document". "Intelligent document" is a general term to describe electronic documents with more functionality than a page designed to emulate paper. For example, the PDF from Adobe, InfoPath from Microsoft, Cardiff Software and XForms from W3C, and the non-programming solutions AjiDocs and Intelledox are intelligent documents and are based on using XML as a format for data. Intelligent documents are essentially interactive electronic documents. This capability is used to enable the cognitive data to respond to various state changes and events as well as interact with other processes disclosed herein.

To proceed, a "trust" parameter is introduced. "Trust" is a relative confidence parameter or measure where increased "trust" infers a qualifier of security. Conversely, the "trust" parameter can be decreased to infer risk. Additional user behavior cognition implemented in accordance with the present invention may increase and decrease the "trust" parameter accordingly. A degree of trust is established where a high degree of trust may be indicated with a relatively high number, and a low degree of trust may be indicated by a relatively lower number. While the below example indicates trust using a numerical degree of trust, of course other methods of indicating trust may also be used, such as indicating trust using textual information, key words, or other indicators. Implementation of "trust" in one example comprises a scale of 0 through 10 with the following discrete indications:

"Trust" equal to ten indicates that the instantiation of the cognitive data set is new (i.e., the first instantiation of the cognitive data file) and "trusted" which infers an existing instantiation is in the creator's environment or the creator has granted permission for the existence of the instantiation.

"Trust" equal to five indicates that the instantiation does not reside in the creator environment.

"Trust" equal to zero indicates distrust, an instance where an instantiation of the cognitive data set is unacceptable.

Figure 6:
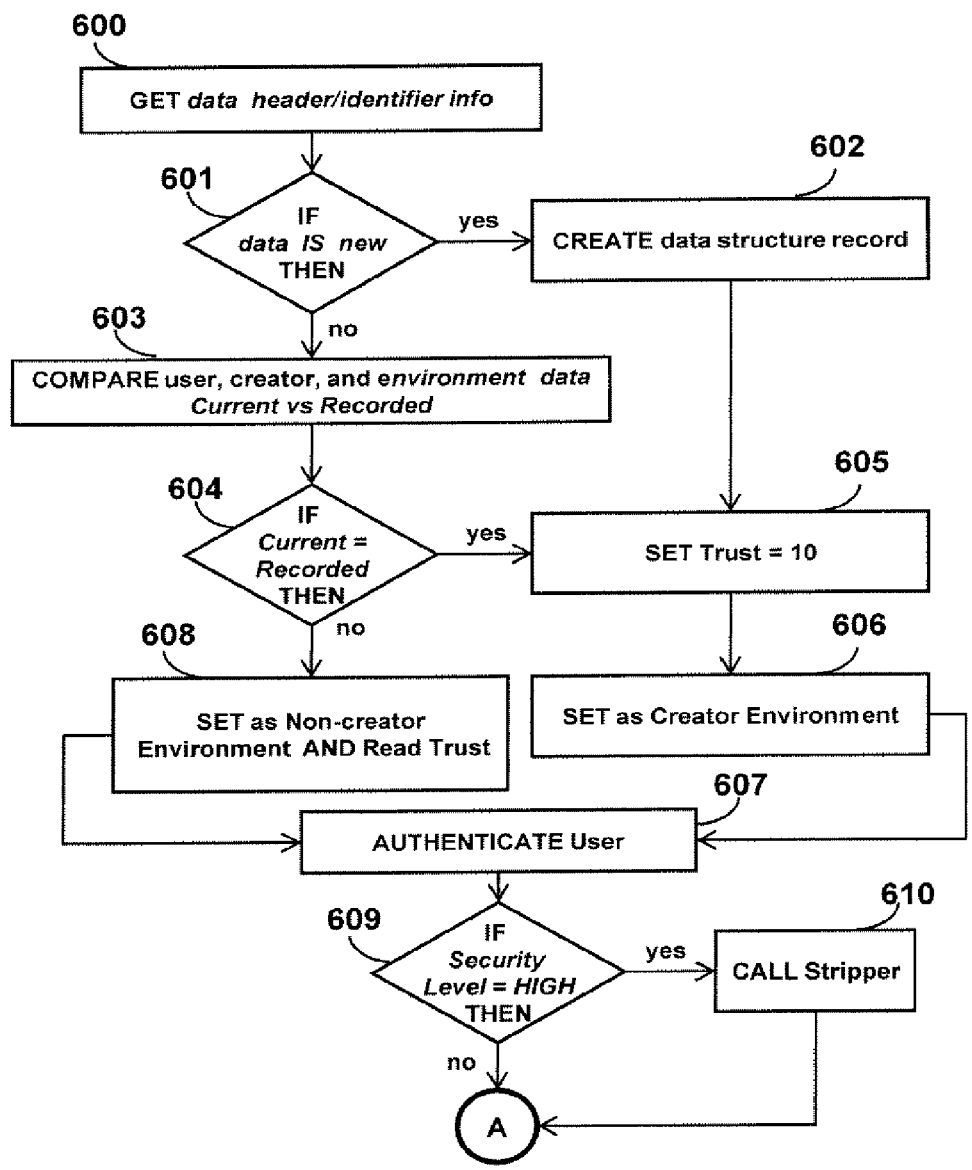
FIGS. 6 and 7 are the flow diagrams for the data structure process.
Figure 7:
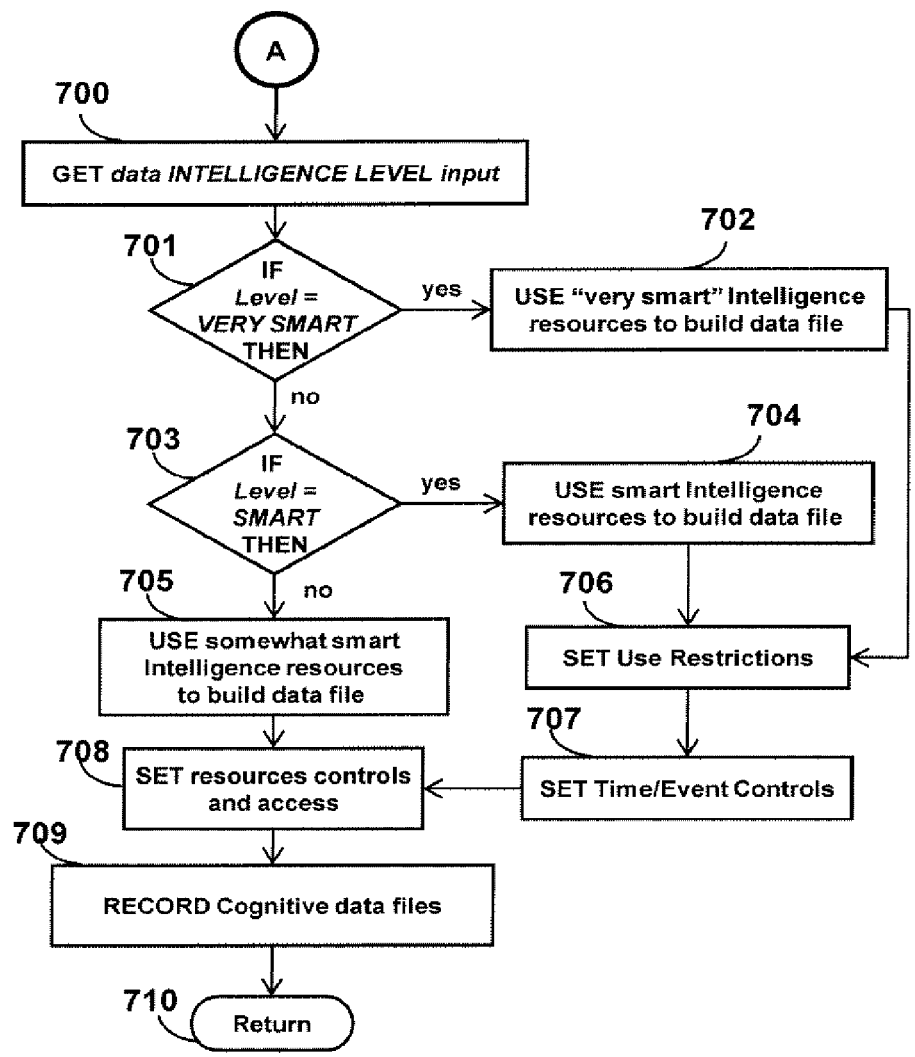

The Data Structure Processor 205 creates new cognitive data and activates existing cognitive data. FIGS. 6 and 7 depict the flow diagram of the Data Structure Process 205. This process commences with reading the header and identifier data record fields in step 600. Note that no data is present if this is a new cognitive data file (i.e., prior to the creator's initial saving or writing of the media into the environment's memory). If the data is newly created (i.e., not saved before) 601, then the data structure record is created 602, trust" is set to ten in step 605 and the current environment is set to the creator environment in step 606. For the case of a pre-existing cognitive data file in step 601, environmental data is compared to the pre-recorded data fields in step 603 to determine if the environment is the same. If the environment is determined to be the same in step 604, "trust" is set to ten in step 605 and the current environment is set to the creator environment in step 606. If the environment is determined to not be the creator environment in step 604, then this is an instantiation of an existing cognitive data file in a non-creator environment and in step 608 the trust value from the stored record will be used. Once the environment and user/creator identity has been established, user authentication is performed using means such as user access passwords in step 607. Then, a check is performed in step 609 to determine if the security level is "high". If the security level is "high", the Stripper process is called in step 610 to access a highly sensitive associated cognitive data and further validate the user/creator.

Processing continues in FIG. 7 wherein the intelligence level is read in step 700 (from the prior input process 400). Processing for a plurality of intelligence levels commences with a check in step 701 to determine if the intelligence level is "very smart". If the intelligence level is "very smart," then the predetermined resources and data structure fields for this condition are applied to produce the cognitive data record in step 702. If the intelligence level is "smart" as determined in step 703, then the predetermined resources and data structure fields for this condition are applied to produce the cognitive data record in step 704. For the "very smart" and "smart" cases, use restrictions are set in step 706 and time/event controls are obtained either from the stored data or the user/creator in step 707. These input restriction preferences are used to manage and limit future use of the resulting data instantiation. And finally, if the intelligence level is not "very smart" or "smart" then "somewhat smart" resources and data structure fields are used in step 705.

Cognitive level resources comprise additional functionality that incorporates "how smart does the data need to be?" For example, if the creator needs the cognitive data file set exist only during a response to an emergency incident wherein the data is being shared across government agencies to support interoperability, this data file could be constrained to self-destruct (i.e., delete the instantiation of the data set) upon the end of the interoperable communication session in which it is used. Another example may comprise an expiration time upon which the data file will self-destruct or an archive time wherein the data will automatically self-archive. Self-archiving could relate to the cognitive data file zipping itself and moving into a specific memory archive location which could be memory in the Cognitive Data Repository 204.

Commencing with the step of "set use restrictions" in step 706, the process comprises the creator indicating the resultant data file manipulation limitations such as limiting the number of times an cognitive data file can be opened, inhibiting modification (e.g., the subsequent user cannot edit the cognitive data) or setting the duration which a data file can be viewed at any time. Processing continues to obtain the environmental resource controls and accesses in step 708 dependent on security and intelligence levels to be employed. Then, in step 709 the cognitive data record set and associated resources are written into memory and the process returns to the calling procedure in step 710.

Figure 8:
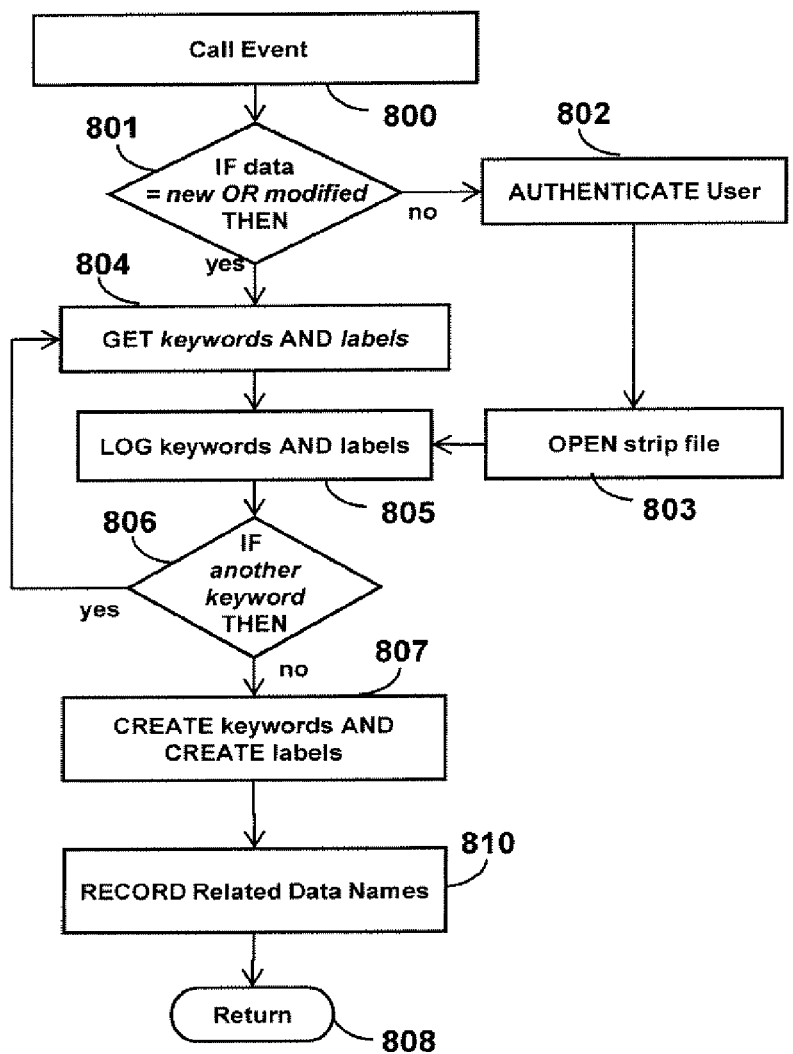
FIG. 8 is the flow diagram of the data stripper process.

In this embodiment, "high" security level requires the use of stripping out highly sensitive data from the document data and storing it in a separate cognitive data file. Samples of highly sensitive data could comprise identity numbers such as social security numbers, names, locations, financial numbers, pricing information, etc. The Stripper process flow diagram is depicted in FIG. 8. Upon a call event in step 800, a check is made to determine if the data file already exists or if a new data file is being created in step 801. If the data file is preexisting, then another user authentication process is performed in step 802 prior to opening the stripped data file in step 803 to add another layer of security. If the data is new in step 801, then this process obtains keyword entries from the creator via the keyboard and/or mouse in step 804 and writes said keywords and their associated labels into separate arrays in step 805 to store into separate memory. This process is iterated until all keywords and their associated labels are entered into the array by steps 805, 806. Once completed, the cognitive data record is created for the stripped key words and another cognitive data record is created for the associated labels in step 807. Then the related data names are recorded in step 810 (the related data names will be discussed later), and processing ends in step 808.

The Stripper process incorporates an additional field for the creator to utilize called an associated label. As an example of the associated label, consider the instance where the creator selects "000-000-000AA", their bank account number, to be stripped out of cognitive data being created. Along with this, the creator associates the text field: "my bank account number" as the associated label.

Using this data-to-data interrelationship permits the creator to achieve another order of security for highly sensitive data. Therefore, when viewing the final document in this example, the "my bank account number" would appear instead of "000-000-000AA" in the resulting document. Further, the data-to-data association capability can enable advanced processing.

The process flow for the "Related Data Names" fields can be supported with a process that requests the creator or user to supply names of other data files they wish to associate with the current cognitive data file, if any. This logic can also be used for "flagging" keywords in the body or context of the data file structure. This utility can be used to support advanced data-to-data analyses. By way of example, if a cognitive data instantiation contains financial fields from the prior day's revenue of a small business, if the current cognitive data file is associated to this prior data file, analyses could be enabled that calculates and derives financial conclusions.

Figure 9:
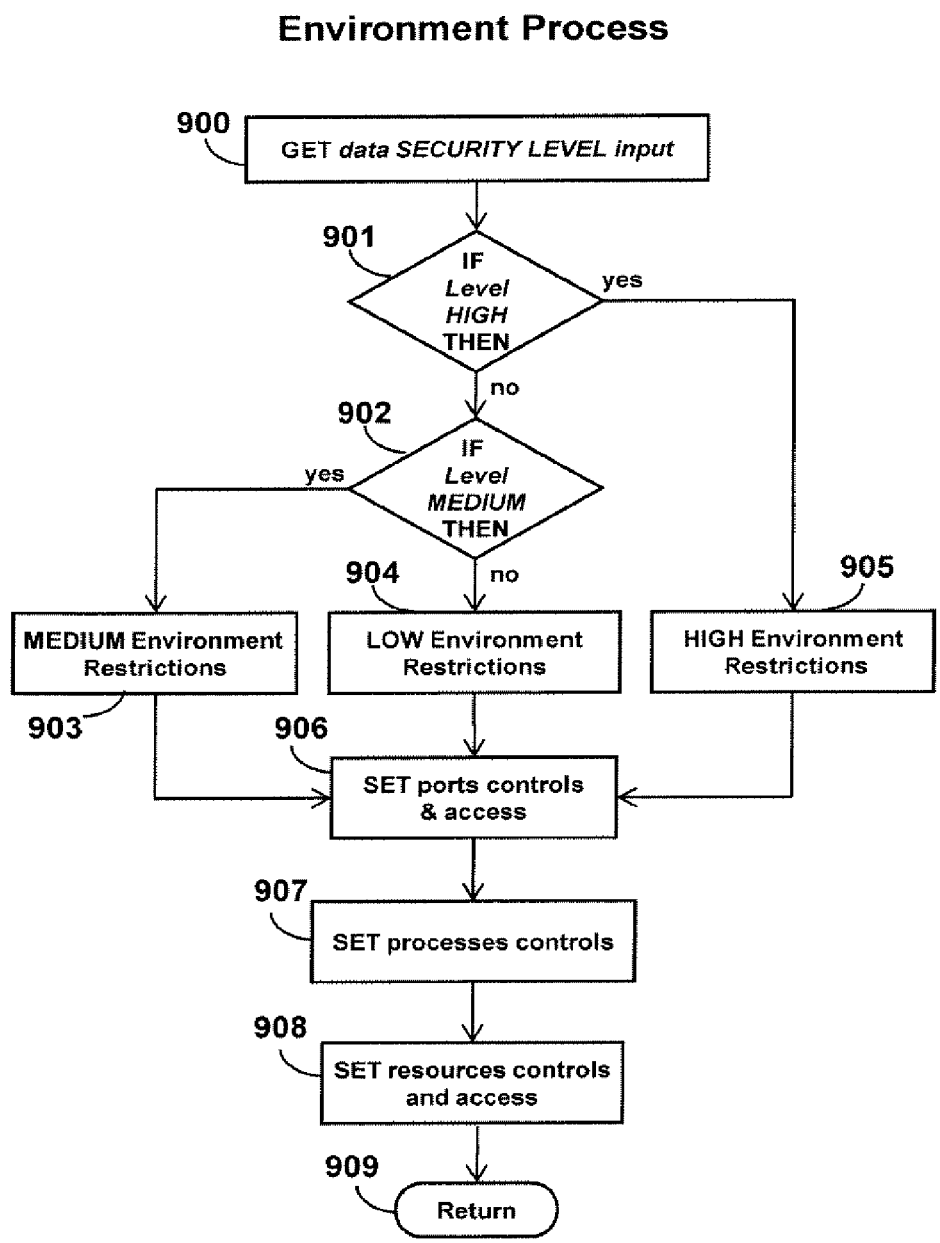
FIG. 9 is the environment process flow diagram of the current cognitive data instantiation.

The environment needs to be controlled to protect the data. This is accomplished using the Environment process 202 flow diagram depicted in FIG. 9. The Environment process 202 is responsible for configuring the environment to protect the cognitive data. Environment controls and settings depend on the security level required while the cognitive data is in the "active" state. This process begins in step 900 by obtaining the security level from the Cognitive Data Processor 201. If the security level is "high" in step 901, then the "high" Environment Restriction conditions are invoked in step 905. Restrictions to unnecessary resources are greatest for this level of security. The "high" security level in this example comprises:

Close all non-essential ports (only permit essential ports to remain open such as the keyboard, mouse, and monitor video port).

Close unnecessary active processes in the environment; shut-down processes that are activated but not needed for the creation and processing of the cognitive data. For example, a Microsoft update process, email, or Google toolbar process may be active and processing in the Random Access Memory (RAM) but are not needed for the creation and manipulation of cognitive data so these non-essential processes are terminated if the data is "very smart".

Resources such as a printer or a database may need to be available to support the creation of the cognitive data file and these can be user selectable via a user interface so the means to access said resources and/or devices could be permitted on a limited basis dependent on creator selection.

If the security level is "medium" in step 902, then the "medium" environmental restrictions are used in step 903. The "medium" level is not as constrained as the "high" level. More processes may be permitted to run in the background (e.g., email) and there may be more port access without the need to first close the data file (e.g., internet access). Finally, if the security level is "low" in step 904 then port control access could be permitted wherein slight access to an internet connect limitations could be configured (e.g., only "trusted" sites can be visited while the cognitive data is in an "active" state). Once environmental restrictions are determined based on the security level, the environment ports and accesses (e.g., remote access) are set accordingly in step 906. Then, in steps 907 and 908, processes controls and resource controls are configured, respectively. The environment is now secured for the "active" cognitive data to be accessed by the user/creator and this process ends in step 909.

Note that schemes such as "port knocking" may be incorporated to further protect the environment while the cognitive data is in an "active" state. Port knocking is used to prevent an attacker from scanning a system for potentially exploitable services thus protecting ports so they will appear closed.

Figure 10:
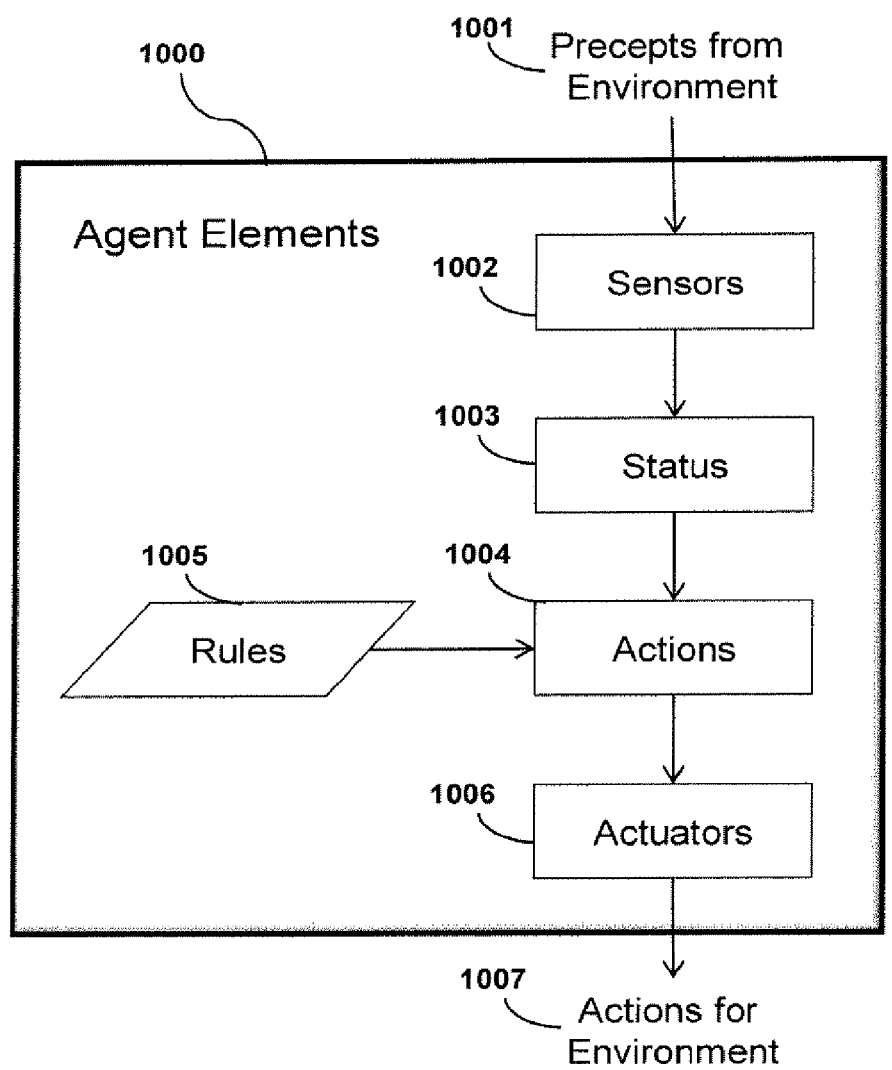
FIG. 10 depicts the Intelligent Agent functional block diagram showing the overall components of a simple Intelligent Agent structure.

The Cognitive Data Processor 201 in this embodiment is implemented augmenting the previously described processes with a Multi-Agent System (MAS) comprising Intelligent Agents (IAs). FIG. 10 depicts fundamental elements of a simple IA wherein the Intelligent Agent 1000 program is a function that implements the agent mapping from Precepts 1001 into Actions 1007. Environment Precepts 1001 are fed into the IA's Sensors 1002. The Status 1003 is "what the world is like now" for the IA. Given the said Status 1003 and applying the IA's Rules 1005, yields specific Actions 1004 taken by the IA. In a simple case, by finding a Rule 1005 that matches the current situation (as defined by the precept), perform the Action 1004 associated with that particular Rule 1005. Actions 1004 are the inputs into Actuators 1006 resulting in Actions taken for the environment 1007 of the IA. More complex IAs includes learning agents that may also be employed. The overall architecture of the Cognitive Data Framework 200 in this embodiment is supported by a collection of these specialized Agents or IAs. Cognition is realized as a set of representations and models that interchange information between these IAs and representations. Each unit functions as a cognitive mechanism to achieve a particular aspect of intelligence, such as upon perception of an event, select appropriate action(s), etc.

Figure 11:
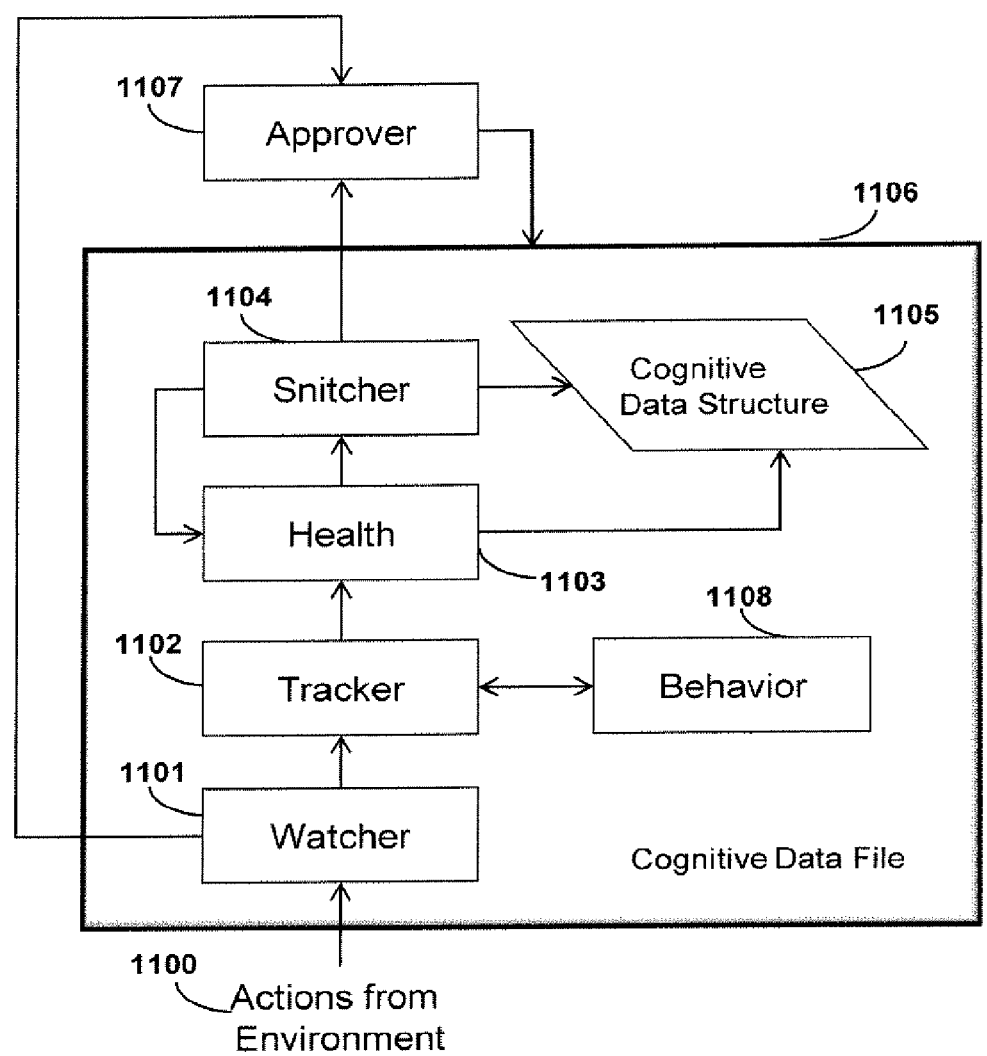
FIG. 11 is a block diagram of the cognitive data Multi-Agent System depicting the components and their relationships.

The MAS for this cognitive data invention is depicted in FIG. 11. A primary purpose of the MAS is to ensure the cognitive data file itself is not compromised. This MAS is comprised of a plurality of IAs that reside in the cognitive data record and/or set of records. The Watcher IA 1101 monitors environment actions 1100 as they relate to access and manipulation of cognitive data, the cognitive data repository, and memory. The Tracker IA 1102 logs all events that transpire with the cognitive data. The Tracker also interfaces with the Behavior IA 1108. The Behavior IA 1108 performs behavior analysis wherein behavior analysis can be of environment events, user behavior, data-to-data behavior, etc. The Health IA 1103 determines the "state of health" of the cognitive data file set and controls the existence of the particular instantiation of cognitive data. The Snitcher IA 1104 gathers information and reports back to the cognitive data creator. The Snitcher IA enables creator control of their data even in a compromised situation. The Watcher Agent 1100, Tracker Agent 1101, Behavior Agent 1108, Health Agent 1103 and Snitcher Agent 1104 are embedded IAs that co-exist in the same physical file or record as the Cognitive Data Structure 1105. The Approver IA 1107 reports to the creator and/or user. Along with reporting, it also provides the means to interact with the said creator and/or user to manage and control the associated cognitive data.

Figure 12:
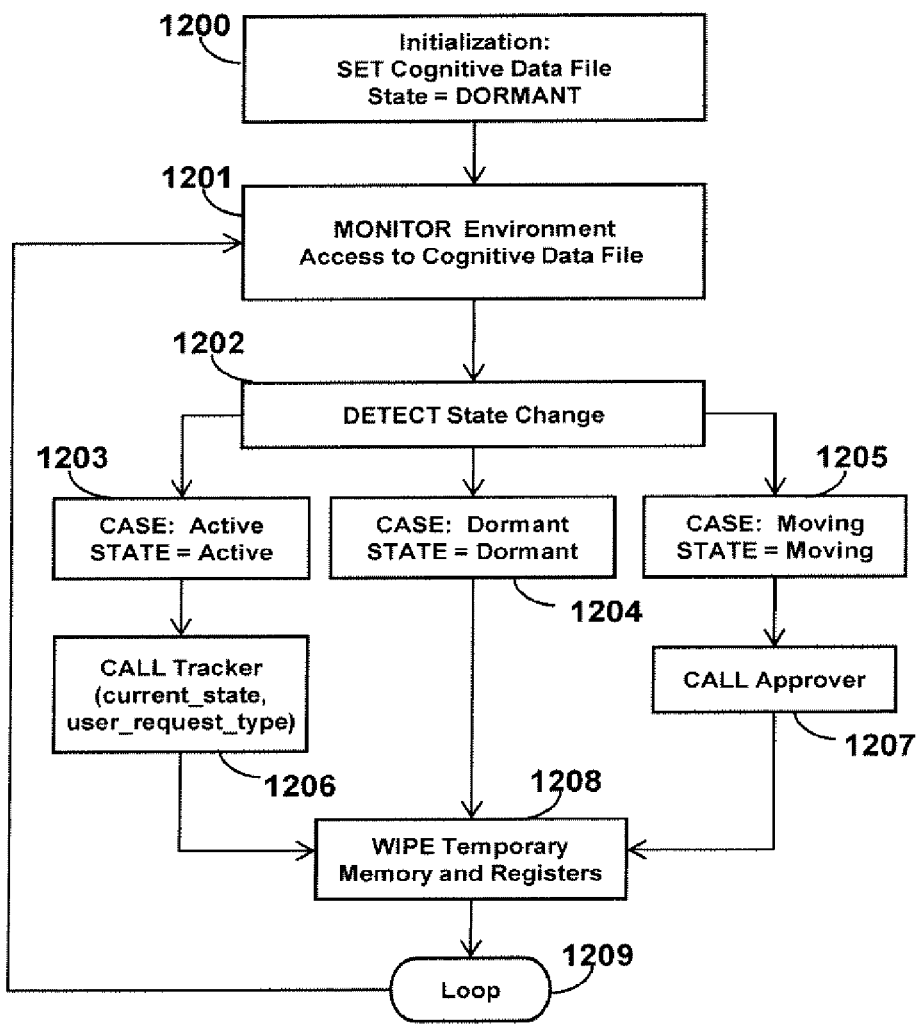
FIG. 12 is the flow diagram of the Watcher Intelligent Agent.

FIG. 12 depicts the Watcher IA process flow diagram. The primary purpose of the Watcher IA 1101 is to monitor and detect a change in the state of the cognitive data file 1106. The Watcher cognitive Data state is initially set to "dormant" in step 1200. Monitoring of the digital computer environment user input means (i.e., IA sensors 1002) commences in step 1201. The Watcher Agent sensors comprise input/output capabilities such as the keyboard, mouse, port communication, and operating system commands. Precepts 1001 from the environment comprise user requests such as the following:

Open (active state)
Print (moving state)
Edit (active state)
Delete (active state)
Save (active state if re-saving new instantiation of same data file set; moving state if saving a completely new instantiation of the data file set)
Copy (moving state as it is a completely new instantiation of the data file set; this is also representative of transmission, as a new instantiation of the data file set is created in the receiving environment)
Move (moving state)
View (active state)
Analyze (active state)

Assuming an initial dormant state and upon the user selection of the cognitive data file (e.g., "open" the cognitive data file selection detected via a "click" of the mouse input device), the status 1003 of the cognitive data file is state change is detected in step 1202, and the status is changed to "active" in step 1203. The IA's Action 1004 upon the cognitive data file becoming "active" is to call the Tracker IA in step 1206 (which will log this event). The following Rule 1005 applies:

IF state=active THEN call Tracker (current_state, user_request);

wherein the actuator 1006 calls the Tracker IA in step 1206. The resulting actions for Environment 1007 comprise invoking the Tracker IA in step 1206 and passing the current_state data and user_request parameters as process arguments. Processing returns to monitoring for a change in state of the cognitive data file of step 1202 after temporary memory and registers are wiped in step 1208. Conversely, if the state change detected is to the dormant state in step 1202, then the Watcher 1101 status is maintained as "dormant" in step 1204 and the process returns to monitoring the cognitive data file for state changes in step 1201 after temporary memory and registers are wiped in step 1208. Finally, if the status change has been detected 1202 to "moving" in step 1205, then the rule 1005 is as follows:

IF state=moving THEN call Approver (current_state, user_request_type);

wherein the actuator 1006 calls the Approver IA 1007 in step 1207. The results of this function provide a means to an alert to the user to a "move data" request type. Upon processing returning to the Watcher Agent process, the environment resources that accessed the cognitive data need to have the temporary memory "wiped" or written over in step 1208 so that stored highly sensitive data such as access codes and keys thus completing the process in step 1209.

Primarily, the Approver IA 1107 performs authentication checks and accommodates creator action approvals. Precepts come from the Snitcher 1104 and the Watcher 1101. The cognitive data file or cognitive data record fields except the actual data body comprise the Sensors 1002 (i.e., metadata) and their values constitute the Status 1003. Actions taken are dependent on the Rules 1005 which can comprise the following:

IF security acceptable THEN permit user_request
IF security somewhat acceptable THEN notify Snitcher
IF security NOT acceptable THEN deny user_request_type AND Notify Health wherein "security acceptable" equates to the current environment settings matching or exceeding the security level data value in the cognitive data record and the trust value; "security somewhat acceptable" is dependent on Snitcher logic (to be discussed later); and "security NOT acceptable" equates to the current user identity not matching the creator identity and the absence of a sense of "trust".

Figure 13:
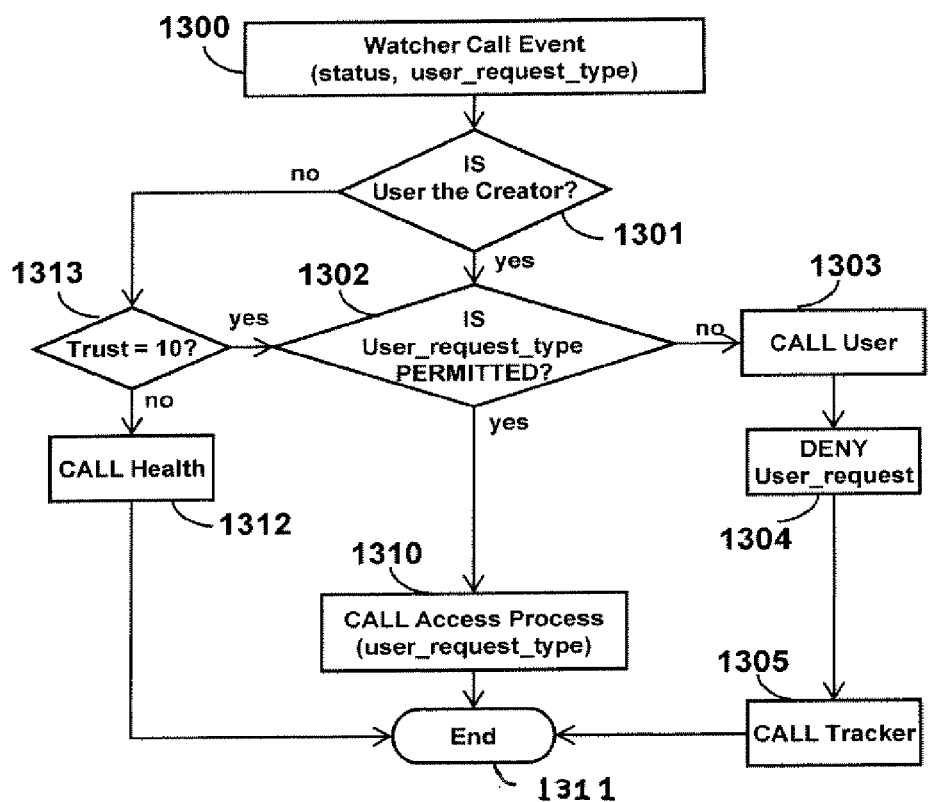
FIG. 13 is the flow diagram of the Approver Intelligent Agent for the Watcher Agent precept.

FIG. 13 depicts a flow diagram to further explain the Approver Agent 1107 as it relates to the Watcher Agent 1101 and Precept 1001. Processing commences upon receiving a call from the Watcher Agent 1101 in step 1300. A check is performed in step 1301 to determine if the current user is the creator of the cognitive data file by comparing the cognitive data record creator identity fields with the current user identity fields. If the creator identity equals the user identity then in step 1302 a check is performed to determine if the user_request_type is permitted based on the stored cognitive data record field settings. If the user_request_type is permitted, in step 1310 the Access process is called passing the user_request_type argument and the process terminates in step 1311. However, if the user_request_type is not permitted in step 1302, then the user is alerted of the action attempt in step 1303 and that the action is not permitted. Thus, the request will be denied in step 1304. This is followed by calling the Tracker Agent 1102 in step 1305 to log this event and the process ends in step 1311. Conversely, if the user_request_type is permitted in step 1302 then the user_request_type is permitted and processed in step 1310.

For the case wherein the user identity is not the same as the creator identity as identified in step 1301 then, the "trust" field is used in step 1313. "Trust" is the measure in which the Approver can determine if an cognitive data record set instantiation is acceptable to the creator. This gives control to the creator of the cognitive data set. If the current user of the cognitive data is not the creator identified in step 1301, then in step 1313 a check is made to determine if "trust" is equal to ten. If "trust" is equal to ten in step 1313 then, processing commences to determine if the user request type is permitted in step 1302, as already explained. If "trust" is not equal to ten, then in step 1312 the Health Agent 1103 is called, and the process ends in step 1311.

The purpose of the Snitcher 1104 is to report to the creator of the cognitive data file set. By way of example, examine the case wherein the cognitive data record is resident in a receiver environment 104. Then, conditions may exist where the Snitcher 1104 infers a breach. This event needs to be reported to the creator. This way, the creator can become apprised as to who has a copy of their cognitive data file (the receiver environment and user identity), obtain a copy of the events log (what the receiving party has done with the data), and influence the health of the particular instantiation cognitive data record.

Figure 14:
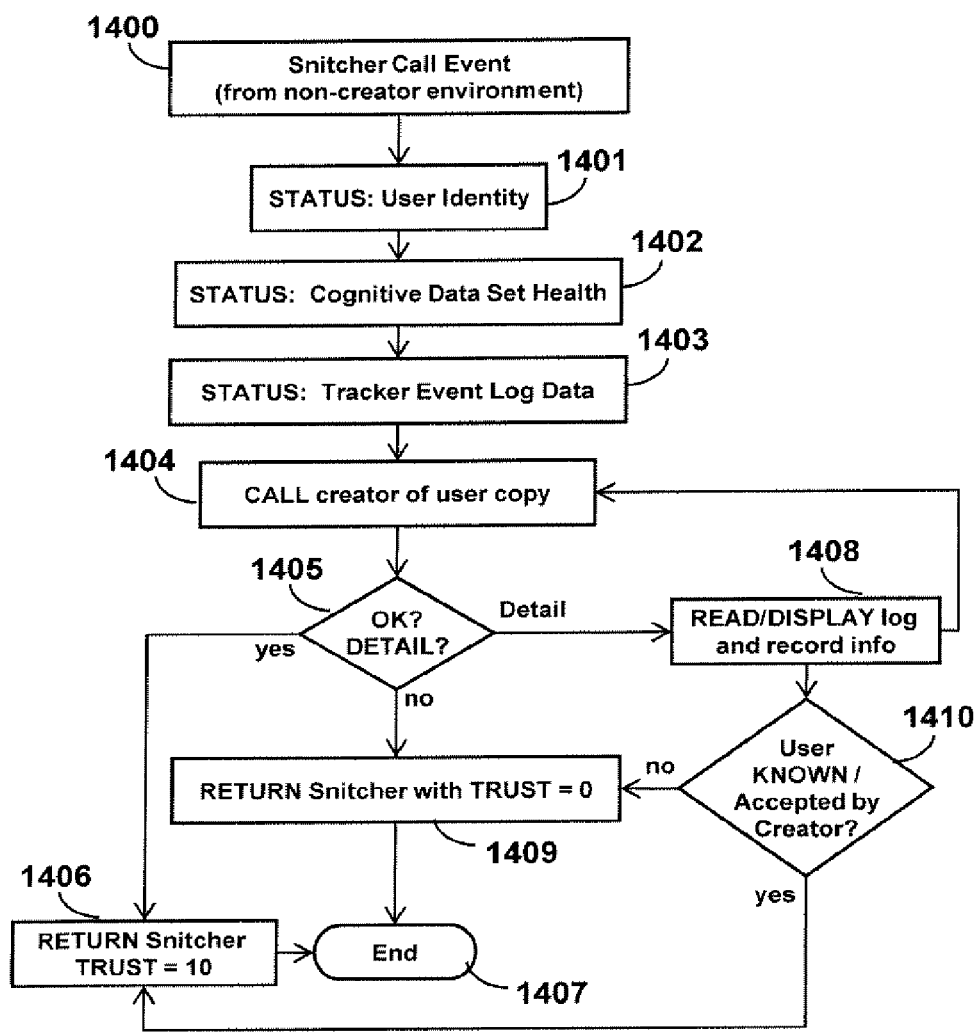
FIG. 14 is the flow diagram of the Creator Approver Intelligent Agent for the Snitcher Agent precept.

With this in mind, FIG. 14 depicts a flow diagram for the Creator's Approver Agent 1107 process upon receiving inputs from an instantiation of the Snitcher Agent 1104, whereupon precept 1001 is examined. Note that this Snitcher Agent does not initially reside in the creator's environment but with the instantiation being processed. Processing commences upon reception of a Snitcher Call Event in step 1400. The Approver 1107 reads the user identity data in step 1401, the health data in step 1402, and the Tracker event log data in step 1403. Note the Tracker event log data will be appended if the size becomes too large to embed in the Snitcher. The Snitcher size needs to be feasible for transmission. In step 1404, the creator may be alerted via a message printed to the creator's screen that another instantiation of the cognitive data file exists, wherein step 1405 the creator is presented the option to indicate this condition is okay. Similarly, an alternative method for this processing step in accordance with the present invention may be to log and record approved users of the cognitive data set so the creator does not have to physically process this acknowledgement. If the creator indicates that the additional instantiation is permissible in step 1405, then the Snitcher is returned with "trust" set equal to ten in step 1406, and the process ends in step 1407. If the creator selects the option of further examining the incident of the instantiation in step 1405, then the log information and record data are displayed for the creator to examine in step 1408. Once examined, the creator is again presented with the option in step 1404 and indicates acceptance or not in step 1405. If the creator determines that the instantiation of the cognitive data file possessed by the user reported is not permissible, then "trust" is set to zero in the Snitcher in step 1409, and it is returned and the process ends in step 1407.

Figure 15:
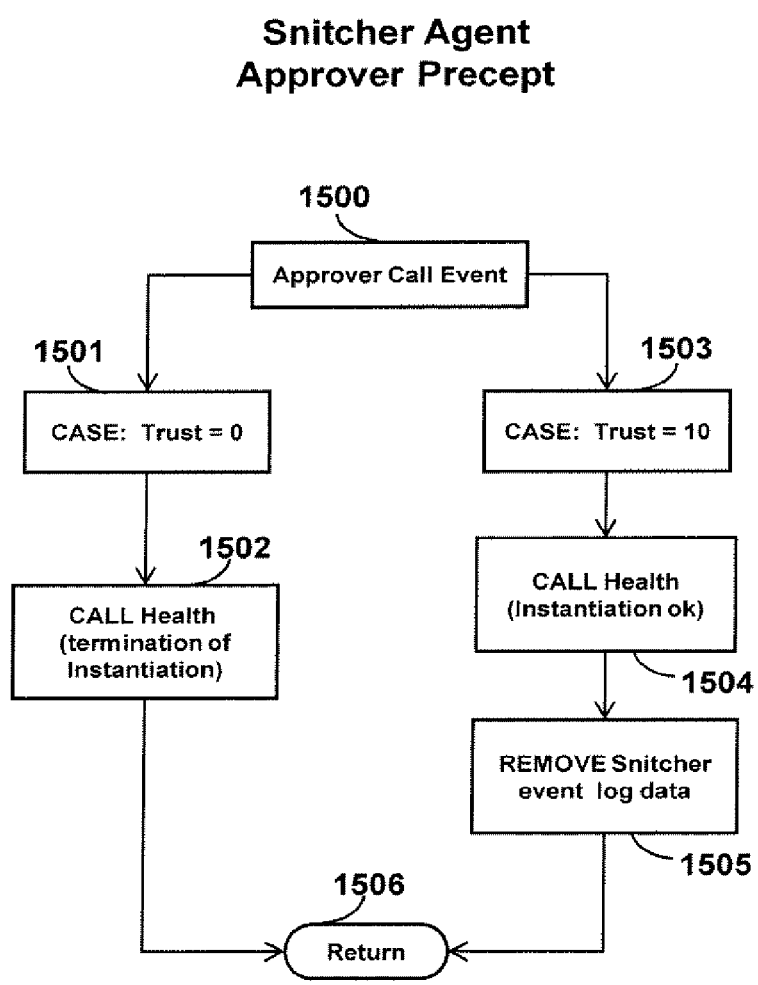
FIG. 15 is the flow diagram for the Snitcher Intelligent Agent of the Approver precept.

The Snitcher Agent 1104 precepts 1001 are from Approver Agent 1107 and Health Agent 1103. The Snitcher Agent 1104 reports back to the creator Approver Agent 1107 instantiation upon detection the cognitive data set residing in a non-creator environment. The said Snitcher Agent 1104 instantiation reporting back to the creator Approver Agent 1107 provides a means of control for the creator for events such as misappropriated or breached data. This gives the creator a means to learn that the said data is misappropriated, the identity of the misappropriator, and a means to attempt removal of the said breached data. FIG. 15 is a process flow diagram of the Snitcher Agent for the Approver Agent 1107 precept. Processing commences upon the event of the Snitcher Agent being called by the Approver Agent 1500. For the case of "trust" equal to zero in step 1501, the Health Agent is called in step 1502 to delete the instantiation of the cognitive data. For the case where "trust" equals ten in step 1503, the Health Agent is called in step 1504 accepting the instantiation from the creator. This event of the Snitcher contacting the creator may be removed from the tracking log in step 1505 then, the process is terminated in step 1506.

Note that the Snitcher Agent needs to be transmitted between the creator environment and a non-creator environment where the instantiation of the cognitive data set resides. This can be accomplished by opening the network port of the current environment and sending the Snitcher to the creator environment network identity, Internet protocol address and computer identity. The Snitcher Agent possesses the Tracking Agent log data that can be leveraged along with the last known Snitcher environment readings (just prior to Snitcher transmission) to return the Snitcher back to the non-creator environment.

Figure 16:
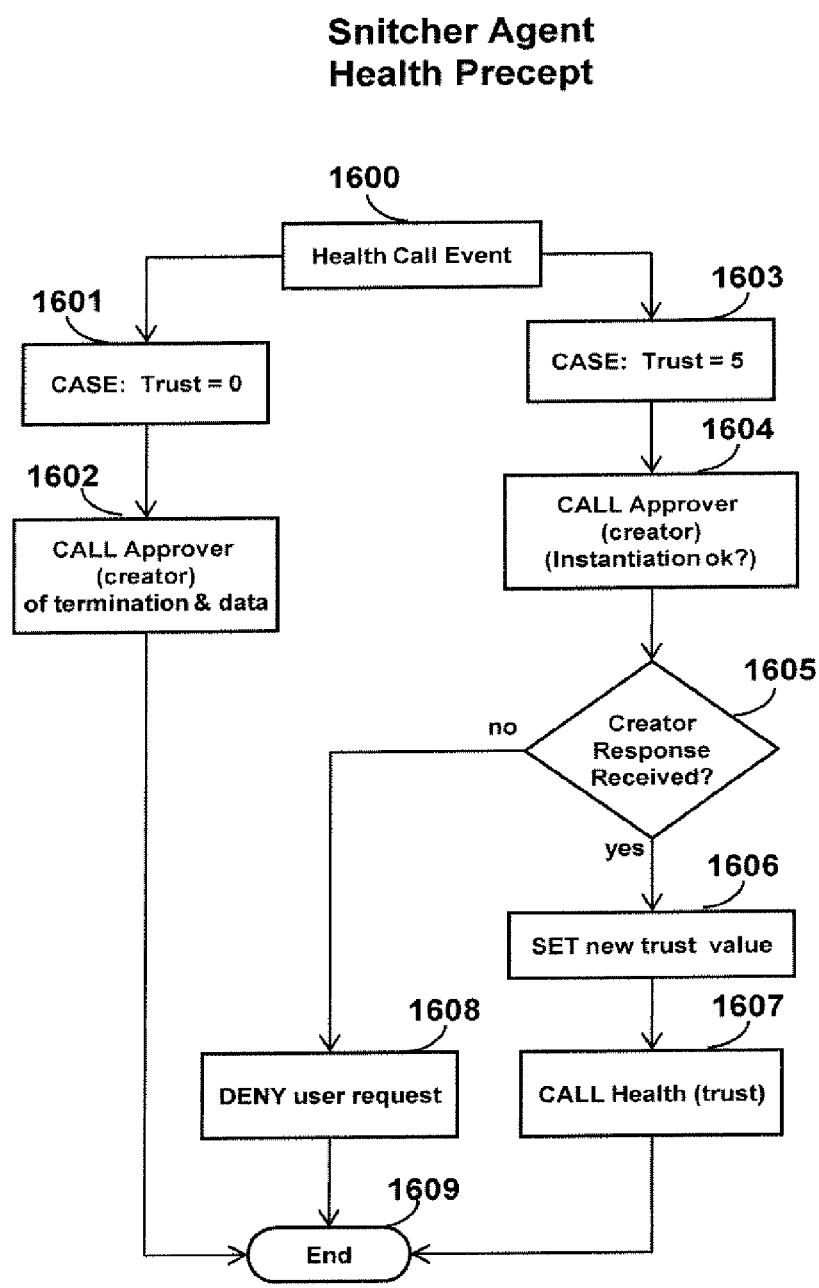
FIG. 16 is the flow diagram for the Snitcher Intelligent Agent of the Health precept.

Next, the Snitcher Agent for the Health Agent 1103 precept process flow diagram in FIG. 16 is examined. Processing commences upon a Health Agent call event in step 1600. For the case of "trust" equal to zero in step 1601, the Approver Agent is called in step 1602 to notify the creator that the misappropriated instantiation of the cognitive data has been deleted, and the process ends in step 1609. For the case where "trust" equal five in step 1603, the Approver Agent is called in step 1604 to determine if the cognitive data instantiation is acceptable to the creator. A check is made in step 1605 to determine if a response is received from the creator. If the creator responds, the "trust" value provided in the creator response is read in step 1606 and the Health Agent is called passing along the "trust" value in step 1607 for further processing. If the creator has not responded in step 1605 within a specified period of time, then the user request is denied in step 1608, and the process is terminated in step 1609.

Note that additional processing may be implemented for receiving an acknowledgement from the creator 1605, such as inserting a timer in the process. Said timers could be used in such a way as to continue the processing after a specified time lapse upon lack of creator acknowledgement reception. Additionally, the creator environment could implement a log of user identities that are permitted to possess an instantiation of the cognitive data to automate this process.

Figure 17:
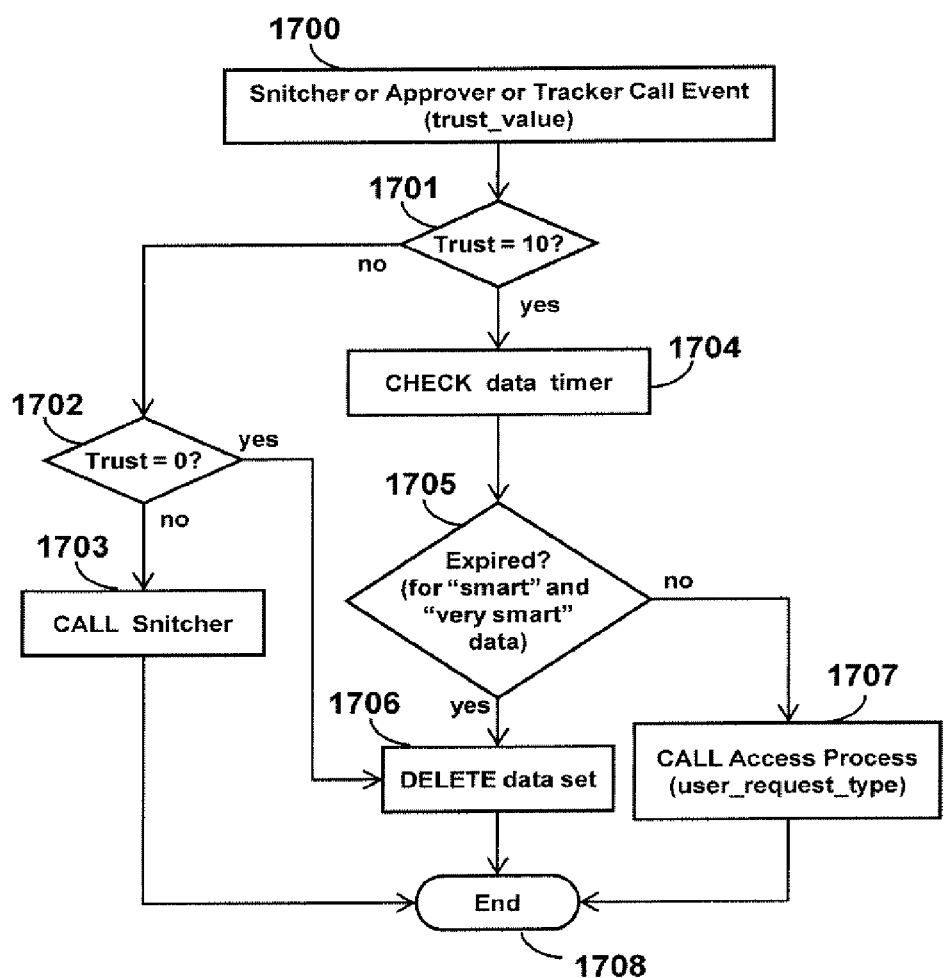
FIG. 17 is the flow diagram for the Health Intelligent Agent of the Snitcher Agent, Approver Agent, and Tracker Agent precepts.

The Health Agent determines if the data is secure and protected or in a compromised situation. It can also determine the life of the data and cause the cognitive data to self-destruct. This is accomplished by monitoring the "trust" value and processing time functions based on restrictions decided by the creator. FIG. 17 depicts a flow diagram for the Health Agent 1103. Processing commences in step 1700 upon receiving a call from a precept with a value for the "trust" parameter. The precepts for the Health Agent comprise the Snitcher, Tracker and Approver. In step 1701, a check is performed to determine if the "trust" value is equal to ten. If the "trust" value is equal to ten then the data timer is checked in step 1704 against the current date/time. Another check is made in step 1705 to determine if the cognitive data has expired. If expired, the data is deleted in step 1706, and the process ends in step 1708. If the data has not expired in step 1705, then a call is made to the Access Process in step 1707 passing the "user_request_type upon which the process ends in step 1708. Note that this additional cognition is achieved for the "smart" and "very smart" cases wherein the "life" of the data can be determined based on an event or time.

The Tracker Agent 1102 records all log data for the cognitive data file thus maintaining an event history of all events that occur with the cognitive data file. This is extremely valuable upon a security breach as it enables traceability. An advanced implementation of the Tracker could include reporting incidences in real-time to security or to other third party software such as virus or firewall protection software to provide immediate or considered remediation upon a breach.

Advanced cognition implementations can be incorporated into the systems and methods of the present invention. One valuable capability is to provide behavior cognition. An implementation may possess multiple Behavior Agents wherein these agents support particular behavior analysis. By way of example, user behavior cognition can be implemented wherein the cognition can make an inference regarding appropriate use of the data. This capability could aid in detection of employee misconduct and unintentional actions that are the greatest cause of data security breaches. This capability could thus help the user and the enterprise maintain security inside the enterprise.

Figure 18:
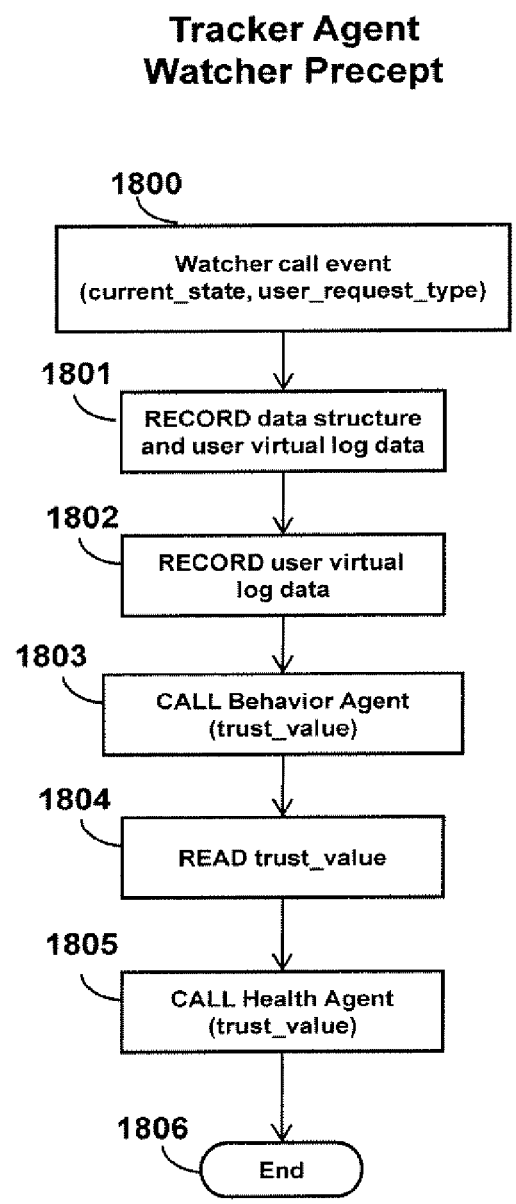
FIG. 18 is the flow diagram for the Tracker Intelligent Agent of the Watcher precept.

Consider an enterprise employee that uses a notebook computer to work on the premises and at various remote locations. The flow diagram for the Tracker Agent 1102 with the Watcher IA 1101 precept in FIG. 18. Processing commences in step 1800 upon receiving a call from the Watcher Agent to log an event upon which a new entry into the cognitive data record log fields is recorded in step 1801 along with the user virtual log data fields in step 1802. The Behavior Agent is called in step 1803 (which will be discussed later). Recall that the log data is comprised of all the data structure fields except the "body" field. In this example, the user virtual log data fields records usage of an enterprise notebook computer relative to the employee's work schedule and any a priori data. Virtual log fields are as defined below:

User virtual log [(vs) (s) (ss) all fields] (note: this field records notebook computer use at an enterprise and at remote locations)
  Enterprise environment use log
   Activated
   Terminated
   Throughput usage
  Remote environment use log
   Activated
   Terminated
   Throughput usage
  Schedule (employee entry and confirmed based on prior use analysis)
   Work location
   Remote location(s)
   Travel location(s)
   Hours (daily schedule)
   Duration
   Cognitive data access history (note: Age data from the cognitive data structure compliment this field)
    Location
    Name of data record
    Frequency
    How often The Behavior Agent returns with a "trust" value which is read in step 1804. Then, the Health Agent 1103 is called in step 1805 passing the "trust" parameter and ending the process in step 1805.

Figure 19:
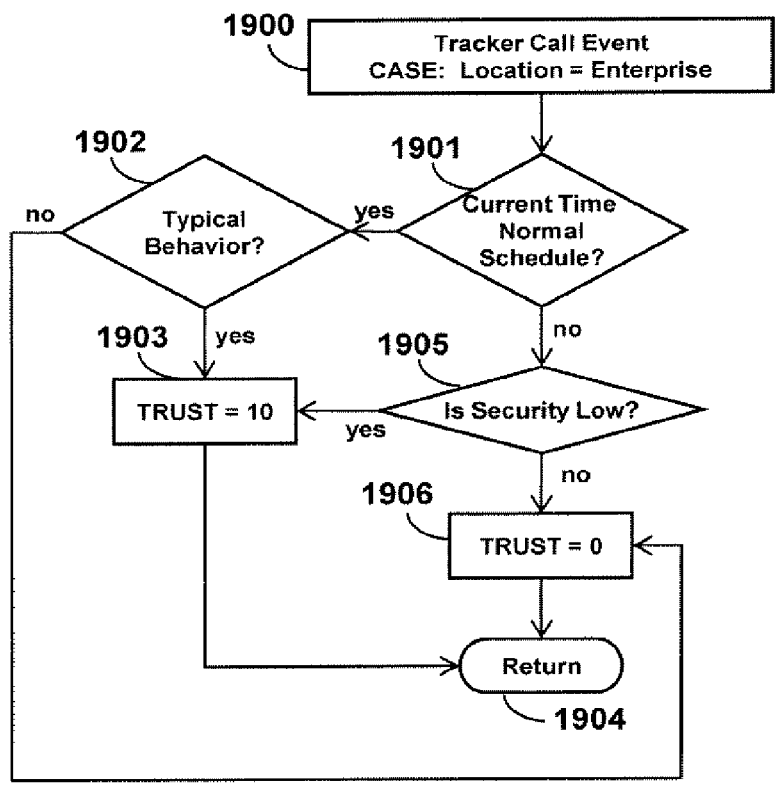
FIG. 19 is the flow diagram for the Behavior Intelligent Agent flow diagram for the enterprise location.

The Behavior IA 1108 process flow diagram is depicted in FIG. 19 determines if the user (i.e., an enterprise employee) can gain access to user_requested cognitive data from an enterprise environment. Assume enterprise security policy applies the following rules:

Access to "high" and "medium" security level data restricted to the enterprise environment AND only during normal work hours, and Access restricted to "low" security level data restricted to the enterprise environment AND during normal work hours AND after normal work hours.

Processing commences upon a Tracker call event in step 1900. A check is made in step 1901 using the log data and data structure metadata to determine if the user_request for cognitive data access being invoked in the enterprise environment is during the user's normal work schedule. Logic to create rules may comprise:

Schedule IS Monday through Friday AT Enterprise
Time_of_day_Schedule IS 8 a.m. UNTIL 5 p.m.
normal_work IS during Schedule AND Time_of_day_ Schedule If step 1901 determines yes, then another check is made in step 1902 to determine if the access request is typical user behavior. To determine this, consider the simple case of reading the frequency field of the User Virtual log wherein a flag is updated per iteration of user access to the data instantiation. A sample of logic to build rules for the "typical user behavior" would be as follows:

IF frequency IS GREATER THAN 2 AND how_often IS GREATER THAN twice_a_day THEN user_behavior EQUAL TO typical
ELSE user_behavior EQUAL TO not_typical A priori log events can be used to determine if the user has accessed this data before. If the user behavior is determined to be "typical" then "trust" is equated to ten in step 1903, and the process ends in step 1904. If the user behavior is "not typical" in step 1902 then "trust" is equated to zero in step 1906, and the process ends in step 1904. For the rest of the security policy, if the current time does not fall during the normal work schedule in step 1901, then another check is made in step 1905 to determine the security level. If the security level is low in step 1905, then "trust" is equated to ten in step 1903, and the process ends 1904. However, if security is either "high" or "medium" in step 1905, then "trust" is equated to zero in step 1906, and the process ends in step 1904. Similar logic can be applied for the case of the employee working remotely (i.e., the notebook computer requesting access is not at the enterprise location). If the user is determined to perform breach or erroneous behavior, the creator is notified. This capability can be valuable for corporate or government agency environments that must ensure data security.

Another approach to software implementation is to create an adaptive capability, adaptive cognitive data, by employing Artificial Intelligence (AI) techniques and algorithms. These implementations replace or augment von Neumann processing disclosed earlier. Additional functionality and enhancements can be implemented based on how intelligent the creator desires the cognitive data to become, how adaptive does the cognitive data need to be, and what additional knowledge should the cognitive data have to meet the creator's needs.

AI can be implemented throughout the MAS. By way of example, consider the determination of "trust" wherein the cognitive data reasons "do I trust the user?" This adaptive reasoning can be implemented using a discipline of AI called Fuzzy Inference (FI) logic, which possesses the antecedents of the user's work schedule, the user's current environment location, and the user's historical use of the cognitive data instantiation, and the like. The following parameters may be employed to use the FI system:

Time-of-day
User's daily work schedule hours
Environment current IP address/network identification data
Environment past IP addresses/network identification data
Frequency of user accessing cognitive data The FI system can process these inputs to determine the level of trust, wherein trust is the output of the FI system. The FI crisp output values for trust are X(0, 5, 10) complying with the logic disclosed herein.

Figure 20:
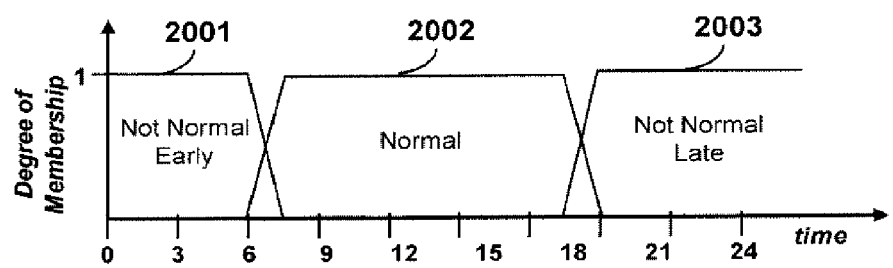
FIG. 20 is the graphical representation of the Work Schedule membership functions.
Figure 21:
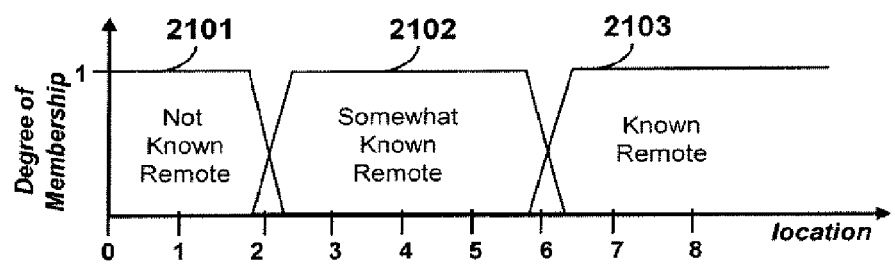
FIG. 21 is the graphical representation of the Remote Environment membership functions.
Figure 22:
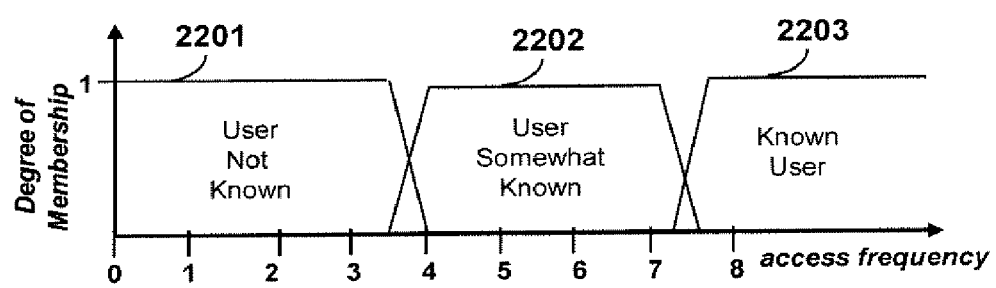
FIG. 22 is the graphical representation of the History Usage membership functions.

The FI membership functions are provided in FIGS. 20, 21, and 22. The degree of membership of these functions range from Y(0, 1). In FIG. 20, the work schedule membership classifies the membership functions based on the user's work hours (i.e., time of day). The function 2001 from 12 a.m. until around 6 a.m. classifies a "not normal work time early in the day"; function 2002 shows a range from around 7 a.m. until around 6 p.m. and is classified as "normal work time"; and the work time after around 6 p.m. shown as function 2003 is considered "not a normal work time late in the day".

FIG. 21 implements the cognitive data's inference about its environment location based up a priori data on the location and frequency of the user's access from that location. The first function 2101 represents not recognizing the remote user environment (i.e., by checking the IP address and network information and not finding it in the event log). The membership function 2101 represents the remote location has never been used before and until the location has been used a couple of times. Once used on additional occasions, for about two to five times, the data "somewhat knows" the remote environment, and function 2102 (per the membership function representation) is used to represent this instance. If the user continues to repeatedly utilize the remote location, after five times the environment becomes "known" to the data, and the function is represented as function 2103. Of course other labels and functions may be used to denote the degree to which the system recognizes the remote user environment, and different values and time frames may be used with which to arrive at the determinations of "not known remote", "remote somewhat known" and "known remote." Additionally, if the location is at the enterprise where the user works, the data file "knows" the environment which is an inferred membership function as the frequency of use should be a high number.

Figure 23:
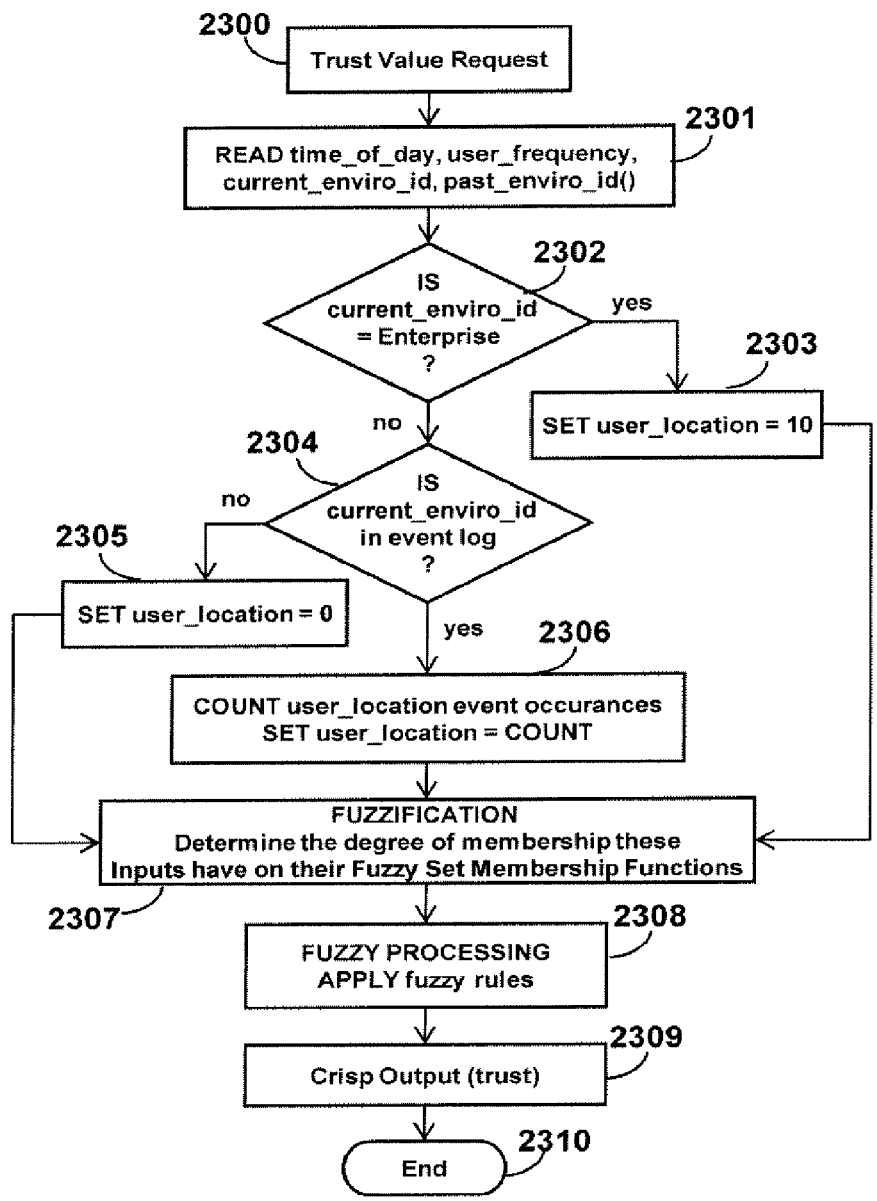
FIG. 23 is the flow diagram for the Fuzzy Inference processing.

Similarly, FIG. 22 implements the cognitive data's membership functions about how well the data knows the user. This is based upon the frequency of the user accessing the data. The data does not consider the user "known" if the user has accessed it less than around four times as shown by function 2201; the data considers the user "somewhat known" if the user accesses the data around four to seven times shown by function 2202; and the data considers the user "known" if the user accesses it more than around seven times shown by function 2203. As outlined above with regard to the remote location, other labels and functions may be used to denote the degree to which the system recognizes the user, and different values and access frequency may be used with which to arrive at the determinations of "user not known", "user somewhat known" and "user known." In the above example, these FI antecedents are used to apply the following rules:

IF normal_time AND environment_not_known_remote AND user_known THEN trust=5;
IF normal_time AND environment_somewhat_known_ remote AND user_known THEN trust=5;
IF normal_time AND environment_known_remote AND user_known THEN trust=10;
IF normal_time AND environment_enterprise AND user_ known THEN trust=10;

IF not_normal_early OR not_normal_late AND environment_not_known_remote AND user_known THEN trust=0;
IF not_normal_early OR not_normal_late AND environment_somewhat_known_remote AND user_known THEN trust=5;
IF not_normal_early OR not_normal_late AND environment_known_remote AND user_known THEN trust=10;
IF not_normal_early OR not_normal_late AND environment_enterprise AND user_known THEN trust=10;
IF normal_time AND environment_not_known_remote AND user_not_known THEN trust=0;
IF normal_time AND environment_somewhat_known_remote AND user_not_known THEN trust=0;
IF normal_time AND environment_known_remote AND user_not_known THEN trust=5;
IF normal_time AND environment_enterprise AND user_not_known THEN trust=5;
IF not_normal_early OR not_normal_late AND environment_not_known_remote AND user_not_known THEN trust=0;
IF not_normal_early OR not_normal_late AND environment_somewhat_known_remote AND user_not_known THEN trust=0;
IF not_normal_early OR not_normal_late AND environment_known_remote AND user_not_known THEN trust=0;
IF not_normal_early OR not_normal_late AND environment_enterprise AND user_not_known THEN trust=0;
IF normal_time AND environment_not_known_remote AND user_somewhat_known THEN trust=0;
IF normal_time AND environment_somewhat_known_remote AND user_somewhat_known THEN trust=0;
IF normal_time AND environment_known_remote AND user_somewhat_known THEN trust=5;
IF normal_time AND environment_enterprise AND user_somewhat_known THEN trust=10;
IF not_normal_early OR not_normal_late AND environment_not_known_remote AND user_somewhat_known THEN trust=0;
IF not_normal_early OR not_normal_late AND environment_somewhat_known_remote AND user_somewhat_known THEN trust=0;
IF not_normal_early OR not_normal_late AND environment_known_remote AND user_somewhat_known THEN trust=5;
IF not_normal_early OR not_normal_late AND environment_enterprise AND user_somewhat_known THEN trust=10;

FIG. 23 depicts the flow diagram of the unique processing required to support FI processing. It is noted that the same initial processing flow as depicted in FIG. 11 may be employed to monitor for a change of state event. Subsequently, upon a determination of "trust," the FI processing of FIG. 23 can be invoked wherein the processing begins upon a request to determine "trust" in step 2300. In step 2301, the time_of_day is read from the environment's system clock; user_frequency of the user accessing the data is read from the virtual log; current_environment identifying information is read; and past instances of the current_environment logged into the event log is summed to obtain the crisp inputs into the FI system.

In step 2302, a check is made to determine if the current environment identification is located in the enterprise facility network. If the identity is affirmed to be at the enterprise then the user_location value is set to 10 in step 2303. If not, another check is made in step 2304 to determine if the current environment is in the event log. If the event log produced zero events of the user's current environment then the user_location is set to zero in step 2305 indicating that the environment is not known to the data. Otherwise, the sum total of times the user accessed the data in their current environment is set in step 2306, and the process continues in step 2307.

The time_of_day, user_location, and user_frequency are the crisp inputs into the fuzzification process wherein the FI membership functions are generated in step 2307. Then the FI Rules are applied in step 2308. The rule that yields the strongest result is considered the consequential functional operator determining the value for "trust". Once the strongest rule is applied, the crisp value for "trust" is obtained in step 2309, and the process ends in step 2310.

Figure 24:
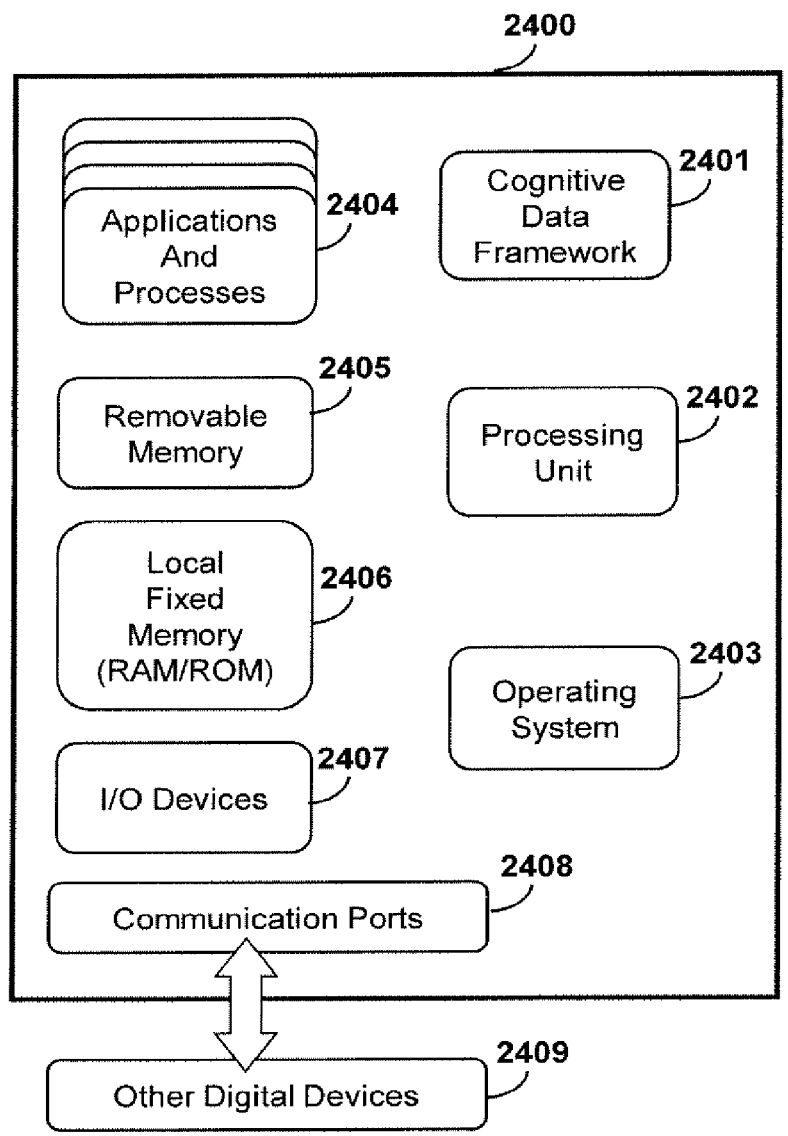
FIG. 24 is a block diagram of hardware resources needed to support the cognitive data system and method disclosed. The implementation of the hardware can either be as a standalone unit that interfaces to external device functions or an integrated element/feature set.

For the purpose of discussion, and not for the purpose of limitation, FIG. 24 depicts a high level hardware implementation of the FIG. 2 cognitive data system. A digital computational system 2400 employs a processing unit 2402. However, the functions indicated in FIG. 2 can be integrated together or packaged separately in numerous configurations as described later. These configurations can range from microcontroller units to Personal Computer systems, enterprise workstations, servers, gateways, network systems, and/or other hardware that accepts and processes data.

With reference to FIG. 24, one exemplary system for implementing the disclosed embodiment includes a computing device or computing modules, such as a digital computing device 2400. The basic configuration of the computing device 2400 comprises at least one processing unit 2402, removable memory 2405, local fixed memory 2406 which comprises Random Access Memory (RAM) and Read Only Memory (ROM) and hard drive system memory. System memory configurations vary but typically include the memory elements stated. The computing device also includes an operating system 2403 and a plurality of applications and processes 2404. The computing device 2400 may also comprise input/output (I/O) device(s) 2408 such as keyboard, mouse, pen, and voice input device, touch input device, a display, speakers, printer, etc. Other digital devices 2409 interface with the computing device 2400 via the computing device communication ports 2407. These additional data storage devices (removable and/or non-removable) may comprise for example, magnetic disks or optical disks, printers, modems, etc. Computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 2400. Any such computer storage media may be part of device 2400.

To clearly describe the hardware support functions required for the cognitive data system 2400 of FIG. 24, the following example of the steps performed upon utilizing the cognitive data framework is explained along with details as they relate to the hardware. The cognitive data system and method 2400 comprises software or hardware modules coded according to the flow diagrams of FIGS. 3-18. This code is stored in memory within controller 2400 in one embodiment and may be stored in a computer readable medium with instructions encoded thereon to be read by cognitive data system 2400. When executed by processing unit 2402, these instructions cause the processing unit to implement the steps set forth in the flow diagrams of FIGS.

3-18. Data is accessed and stored utilizing the removable memory 2405 and/or local fixed memory 2406 to execute cognitive data framework application software 2401, as well as other applications, and processes 2404 (e.g. other software applications such as Windows Explorer, Microsoft Office software, and the like.). The cognitive data framework may be implemented as a "standalone" software application or it may be "a plug-in" application. If the cognitive data framework is a "plug-in" application, the capability would be accessed via other third-party software applications 2404. For example, if the cognitive data framework application is a "plug-in" for the Microsoft Word processing product, it could provide the functionality disclosed herein offering an cognitive data option to the user.

The operating system 2403 translates the instructions into executable actions that causes hardware of the system 2401 and other devices 2409 to respond and function in accordance to said executable code. Other digital devices 2409 connect to the system 2400 via communication ports 2408 using hardware or wirelessly. The cognitive data framework software 2401 monitors the hardware input/output ports 2407, such as a keyboard and/or mouse, for creator or user selection. Upon receiving a creator or user request from an input/output device 2407, the cognitive data framework software instructions 2401 are invoked. The RAM/ROM 2406 provides the memory necessary to support the load of the executable instructions and memory to support the real-time processing. The processing unit 2402 executing the cognitive data framework code 2401 accesses the data storage memory 2405 to support software executions and execution of the instructions. In one embodiment, the cognitive data resources and repository is used to store cognitive data and resources as a section of memory 2406. Upon sensing creator or user selection, the state of cognitive data stored in memory 2406 or other digital device memory capabilities 2409, changes from dormant to "active" or "moving". The computational environment configuration is compared and configured in accordance to the configuration indicated in the stored cognitive data record fields and metadata to support the intelligence level and security level indicated by said stored cognitive data. To achieve these levels of security and intelligence, resources may be shutdown or activated accordingly (e.g., the Internet port 2408/2409 may be shut down to achieve the indicated security level required to activate and access the stored cognitive data file resources). Ports are subsequently managed (i.e., opened and closed) to transmit software from one environment to another as is the case for transmission of the Snitcher software from a receiving environment to the creator environment and back thus providing remote control for the creator of an instantiation of their data in a non-creator environment.

The disclosed method and system advantageously protects user's exposure to undesired and malicious activity by employing advanced control mechanisms implemented at or near the computational device in one embodiment. The cognitive data methodology and system permits the consumer to proactively take control of whom, how, when, and if another party may possess their data. Advantageously, the disclosed methodology transforms data from a passive file that can be obtained, compromised and misused by anyone to an adaptive cognizant, self-controllable data file that enables self-management offering the creator protection and security. This capability can customize cognitive data per the creator's priorities. It also provides an intelligent means for unique configuration of the environment in order to protect the data while in use. Cognitive data are managed and controlled depending on the environment, state, security, health, and the intelligence level of the particular cognitive data instantiation. In this manner, the user is empowered to take control over and limit access to their data.

While only certain preferred features of the invention have been shown by way of illustration, many modifications and changes will occur to those skilled in the art. For example, another embodiment may only process select or stripped data as cognitive data while all other data may not be considered as necessary to become intelligent. This invention is intended to provide the foundation enabler for data cognition. Other advanced processes can be performed leveraging the disclosed cognition capability which may comprise additional IAs to increase cognition features. It is, therefore, to be understood that the present claims are intended to cover all such modifications and changes which fall within the true spirit of the invention.

The devices and subsystems of the exemplary embodiments of FIGS. 1-24 are for exemplary purposes, as many variations of the specific hardware used to implement the exemplary embodiments are possible, as will be appreciated by those skilled in the relevant arts. For example, the functionality of one or more of the devices and subsystems of the exemplary embodiments of FIGS. 1-24 can be implemented via one or more programmed computer systems or devices.

To implement such variations as well as other variations, a single computer system can be programmed to perform the special purpose functions of one or more of the devices and subsystems of the exemplary embodiments of FIGS. 1-24. On the other hand, two or more programmed computer systems or devices can be substituted for any one of the devices and subsystems of the exemplary embodiments of FIGS. 1-24. Accordingly, principles and advantages of distributed processing, such as redundancy, replication, and the like, also can be implemented, as desired, to increase the robustness and performance of the devices and subsystems of the exemplary embodiments of FIGS. 1-24.

The devices and subsystems of the exemplary embodiments of FIGS. 1-24 can store information relating to various processes described herein. This information can be stored in one or more memories, such as a hard disk, optical disk, magneto-optical disk, RAM, and the like, of the devices and subsystems of the exemplary embodiments of FIGS. 1-24. One or more databases of the devices and subsystems of the exemplary embodiments of FIGS. 1-24 can store the information used to implement the exemplary embodiments of the present invention. The databases can be organized using data structures (e.g., records, tables, arrays, fields, graphs, trees, lists, and the like) included in one or more memories or storage devices listed herein. The processes described with respect to the exemplary embodiments of FIGS. 1-24 can include appropriate data structures for storing data collected and/or generated by the processes of the devices and subsystems of the exemplary embodiments of FIGS. 1-24 in one or more databases thereof.

All or a portion of the devices and subsystems of the exemplary embodiments of FIGS. 1-24 can be conveniently implemented using one or more general purpose computer systems, microprocessors, digital signal processors, microcontrollers, and the like, programmed according to the teachings of the exemplary embodiments of the present invention, as will be appreciated by those skilled in the computer and software arts. Appropriate software can be readily prepared by programmers of ordinary skill based on the teachings of the exemplary embodiments, as will be appreciated by those skilled in the software art. Further, the devices and subsystems of the exemplary embodiments of FIGS. 1-24 can be implemented on the World Wide Web. In addition, the devices and subsystems of the exemplary embodiments of FIGS. 1-24 can be implemented by the preparation of application-specific integrated circuits or by interconnecting an appropriate network of conventional component circuits, as will be appreciated by those skilled in the electrical arts. Thus, the exemplary embodiments are not limited to any specific combination of hardware circuitry and/or software.

As stated above, the devices and subsystems of the exemplary embodiments of FIGS. 1-24 can include computer readable media or memories for holding instructions programmed according to the teachings of the present invention and for holding data structures, tables, records, and/or other data described herein. Computer readable media can include any suitable medium that participates in providing instructions to a processor for execution. Such a medium can take many forms, including but not limited to, non-volatile media, volatile media, transmission media, and the like. Non-volatile media can include, for example, optical or magnetic disks, magneto-optical disks, and the like. Volatile media can include dynamic memories, and the like. Transmission media can include coaxial cables, copper wire, fiber optics, and the like. Transmission media also can take the form of acoustic, optical, electromagnetic waves, and the like, such as those generated during radio frequency (RF) communications, infrared (IR) data communications, and the like. Common forms of computer-readable media can include, for example, a floppy disk, a flexible disk, hard disk, magnetic tape, any other suitable magnetic medium, a CD-ROM, CDRW, DVD, any other suitable optical medium, punch cards, paper tape, optical mark sheets, any other suitable physical medium with patterns of holes or other optically recognizable indicia, a RAM, a PROM, an EPROM, a FLASH-EPROM, any other suitable memory chip or cartridge, a carrier wave, or any other suitable medium from which a computer can read.

While the present inventions have been described in connection with a number of exemplary embodiments, and implementations, the present inventions are not so limited, but rather cover various modifications, and equivalent arrangements, which fall within the purview of prospective claims.

What is claimed is:

1. A method for processing data comprising:
    executing on a processor a secured data file comprising a data file and embedded cognitive data processing capabilities for securing the data file, wherein the embedded cognitive data processing capabilities comprise programmed instructions which cause the processor to perform steps comprising:
    establishing an initial dormant state for an instantiation of the secured data file from a plurality of states including a dormant state, an active state, and a moving state;
    monitoring for a state change event of the secured data file to an active or moving state;
    recording the state change event into memory along with metadata describing the current state of the secured data file, wherein the metadata contains at least data creator information, current user information, and current computational environment information,
    wherein said current user information comprises user name, a license key if authentication is used, registration/authentication data, current computational environment configuration data, or combinations thereof, and
    wherein said current computational environment information comprises host name, Domain Name System (DNS) server(s) addresses, Primary DNS suffix, node type, internet protocol (IP) routing enabled, Windows Internet Name Service (WINS) proxy enabled, physical address, Dynamic Host Configuration Protocol (DHCP) enabled, auto configuration enabled, IP address, subnet mask address, default gateway address, DHCP server address, connection specific DNS suffix and description, use of digital certificate, license, and/or digital signature identifiers, use of registration data, use of claims or tokens with .NET environments, or combinations thereof;
    establishing an indication or degree of trust that said secured data file instantiation is permitted, based upon an analysis of said data creator information, current user information, and current computational environment information in relation to security parameters required by an original creator;
    applying security requirements to permit or deny said user access to the data file contents of the secured data file based on the degree of trust of the instantiation, wherein said user access comprises user requests comprising Open, Print, Edit, Delete, Save, Copy, Move, View, and Analyze; and
    managing and controlling the computational environment of the secured data file based on the security requirements.

2. The method of claim 1, wherein establishing the degree of trust further comprises:
    sending the creator an alert of the event upon establishment of a low degree of trust, wherein the alert of the event includes the current user information; and
    removing the instantiation from memory.

3. The method of claim 1, wherein establishing the degree of trust further comprises:
    sending the creator an alert of the event upon establishment of a medium degree of trust, wherein the alert of the event includes the current user information; and
    requesting the creator to approve or reject possession of the instantiation by the current user, wherein if the creator approves the user to possess the instantiation, the degree of trust is reset to high, and if the creator rejects the user to possess the instantiation, the degree of trust is reset to low.

4. The method of claim 1, wherein establishing the degree of trust further comprises:
    granting the user access to the instantiation upon establishment of a high degree of trust.

5. The method of claim 1, wherein establishing the degree of trust is based upon at least one of user behavior, data file behavior, and computational environment behavior.

6. A method for making a secured data file, comprising:
    embedding in a data file cognitive data processing capabilities which, when executed on a processor, cause the processor to perform steps comprising:
    executing on a processor a secured data file comprising a data file and embedded cognitive data processing capabilities for securing the secured data file, wherein the embedded cognitive data processing capabilities comprise programmed instructions which cause the processor to perform steps comprising:
    establishing an initial dormant state for an instantiation of the secured data file from a plurality of states including a dormant state, an active state, and a moving state, wherein the moving state is a form of the active state;

monitoring for a state change event of the secured data file to an active or moving state;

recording the state change event into memory along with metadata describing the current state of the secured data file, wherein the metadata contains at least data creator information, current user information, and current computational environment information, wherein said current user information comprises user name, a license key if authentication is used, registration/authentication data, current computational environment configuration data, or combinations thereof, and wherein said current computational environment information comprises host name, Domain Name System (DNS) server(s) addresses, Primary DNS suffix, node type, internet protocol (IP) routing enabled, Windows Internet Name Service (WINS) proxy enabled, physical address, Dynamic Host Configuration Protocol (DHCP) enabled, auto configuration enabled, IP address, subnet mask address, default gateway address, DHCP server address, connection specific DNS suffix and description, use of digital certificate, license, and/or digital signature identifiers, use of registration data, use of claims or tokens with .NET environments, or combinations thereof;

establishing an indication or degree of trust of a that said secured data file instantiation wherein the degree of trust includes at least one of a degree of certainty or level of confidence that the instantiation is permitted, based upon an analysis of said data creator information, current user information, and current computational environment information in relation to security parameters required by an original creator;

applying security requirements to permit or deny said a user access to the data file contents of the secured data file based on the degree of trust of the instantiation, wherein said user access comprises user requests comprising Open, Print, Edit, Delete, Save, Copy, Move, View, and Analyze; and managing and controlling the computing computational environment of the secured data file based on the security requirements.

7. The method of claim 6, wherein establishing the degree of trust further comprises:

sending the creator an alert of the event upon establishment of a low degree of trust, wherein the alert of the event includes the current user information; and removing the instantiation from memory.

8. The method of claim 6, wherein establishing the degree of trust further comprises:

sending the creator an alert of the event upon establishment of a medium degree of trust, wherein the alert of the event includes the current user information; and requesting the creator to approve or reject possession of the instantiation by the current user, wherein if the creator approves the user to possess the instantiation, the degree of trust is reset to high, and if the creator rejects the user to possess the instantiation, the degree of trust is reset to low.

9. The method of claim 6, wherein establishing the degree of trust further comprises:

granting the user access to the instantiation upon establishment of a high degree of trust.

10. The method of claim 6, wherein establishing the degree of trust is based upon at least one of user behavior, data file behavior, and data file environment behavior.

\* \* \* \* \*